(12) United States Patent
Turntine

(10) Patent No.: US 12,281,463 B1
(45) Date of Patent: Apr. 22, 2025

(54) AUTOMATED CONTROLLING COLD WEATHER HYDRANT INTEGRATED INTO RECREATIONAL VEHICLE PARKING FACILITY

(71) Applicant: James Dean Turntine, Sullivan, MO (US)

(72) Inventor: James Dean Turntine, Sullivan, MO (US)

( * ) Notice: Subject to any disclaimer, the term of this patent is extended or adjusted under 35 U.S.C. 154(b) by 368 days.

(21) Appl. No.: 18/083,814

(22) Filed: Dec. 19, 2022

Related U.S. Application Data

(63) Continuation-in-part of application No. 17/567,293, filed on Jan. 3, 2022, now Pat. No. 12,205,054, which is a continuation-in-part of application No. 17/245,266, filed on Apr. 30, 2021, now Pat. No. 11,215,958.

(60) Provisional application No. 63/291,546, filed on Dec. 20, 2021, provisional application No. 63/018,441, filed on Apr. 30, 2020.

(51) Int. Cl.
| | |
|---|---|
| G06Q 10/02 | (2012.01) |
| B60L 53/66 | (2019.01) |
| E03B 7/12 | (2006.01) |
| F16K 49/00 | (2006.01) |
| G05B 19/042 | (2006.01) |
| G06Q 50/06 | (2024.01) |
| G08G 1/14 | (2006.01) |

(52) U.S. Cl.
CPC .............. *E03B 7/12* (2013.01); *F16K 49/002* (2013.01)

(58) Field of Classification Search
CPC ...... G06Q 10/02; G06Q 50/06; B60L 53/665; G06G 1/148

USPC ......................................................... 700/295
See application file for complete search history.

(56) References Cited

U.S. PATENT DOCUMENTS

| | | | |
|---|---|---|---|
| 2,688,976 A | 1/1951 | Baker | |
| 5,614,119 A | 3/1997 | Ollis | |
| 6,216,722 B1 | 4/2001 | Solomon | |
| 7,143,779 B2 | 12/2006 | Parker | |
| 8,624,428 B2 * | 1/2014 | Hurst | B60L 3/0069 307/10.1 |
| 9,057,453 B2 * | 6/2015 | Pitchford | F16K 31/088 |
| 2004/0254840 A1 * | 12/2004 | Slemmer | G06Q 30/0633 705/28 |
| 2005/0045228 A1 * | 3/2005 | Labrador | E03B 1/02 137/357 |
| 2005/0098627 A1 * | 5/2005 | Chase | G06Q 30/0226 235/382 |
| 2012/0127308 A1 * | 5/2012 | Eldershaw | G08G 1/147 340/932.2 |
| 2014/0088780 A1 * | 3/2014 | Chen | H02J 13/00004 700/295 |

(Continued)

*Primary Examiner* — Md Azad
(74) *Attorney, Agent, or Firm* — Carmody MacDonald P.C.; Dennis J M Donahue, III; Kevin C. Staed

(57) ABSTRACT

The invention described herein is a cold weather hydrant that is preferably integrated into the RV Self-Park utility pedestal and smart parking system but which could be used independently of the RV Self-Park system. The cold weather unit includes a standard water line and spigot, commonly used at RV parks and other areas where potable water is desired, and also incorporates a cold weather housing, heating element and central monitoring computer. The system thereby operates without freezing in cold weather settings and also notifies interested parties of system failures in the event that a failure occurs.

16 Claims, 16 Drawing Sheets

(56) References Cited

U.S. PATENT DOCUMENTS

| | | | |
|---|---|---|---|
| 2014/0089016 A1* | 3/2014 | Smullin | G06Q 10/02 |
| | | | 705/5 |
| 2015/0324709 A1* | 11/2015 | Krivacic | G06Q 10/02 |
| | | | 705/5 |
| 2016/0180712 A1* | 6/2016 | Rosen | G08G 1/147 |
| | | | 705/5 |
| 2019/0385097 A1* | 12/2019 | Hussain | G06Q 10/02 |
| 2022/0309465 A1* | 9/2022 | Scheidegger | G06Q 10/06315 |

* cited by examiner

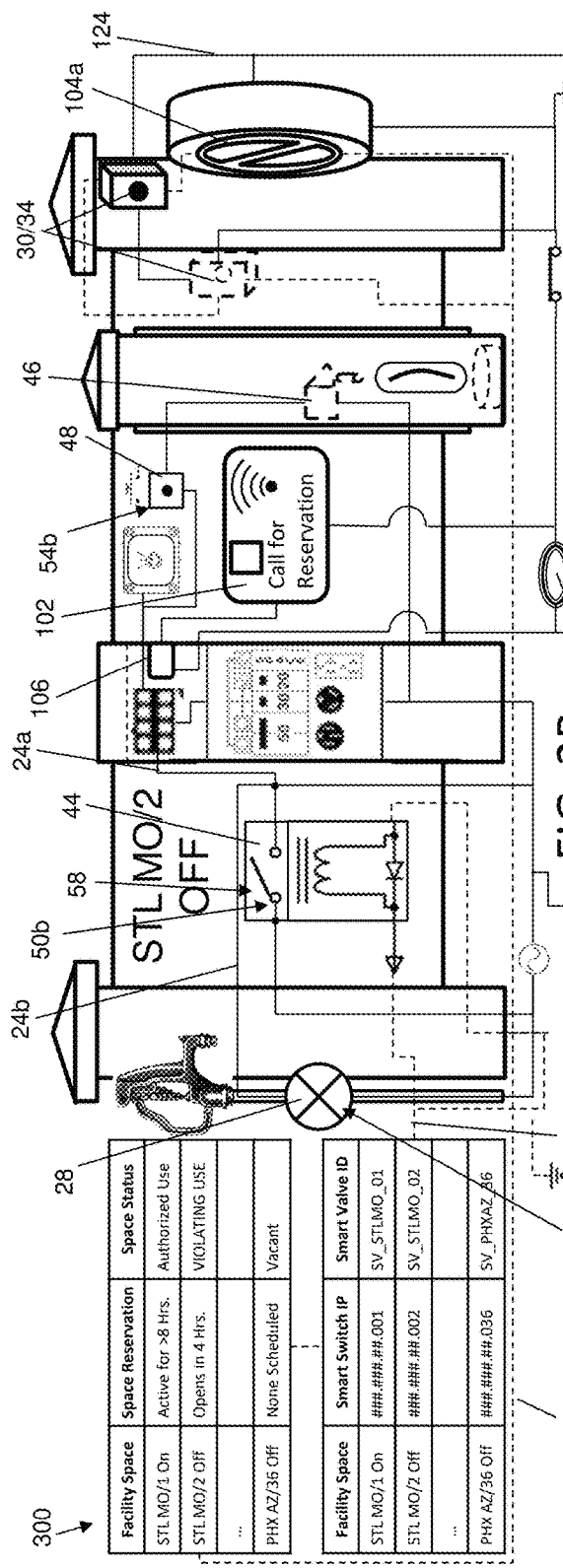
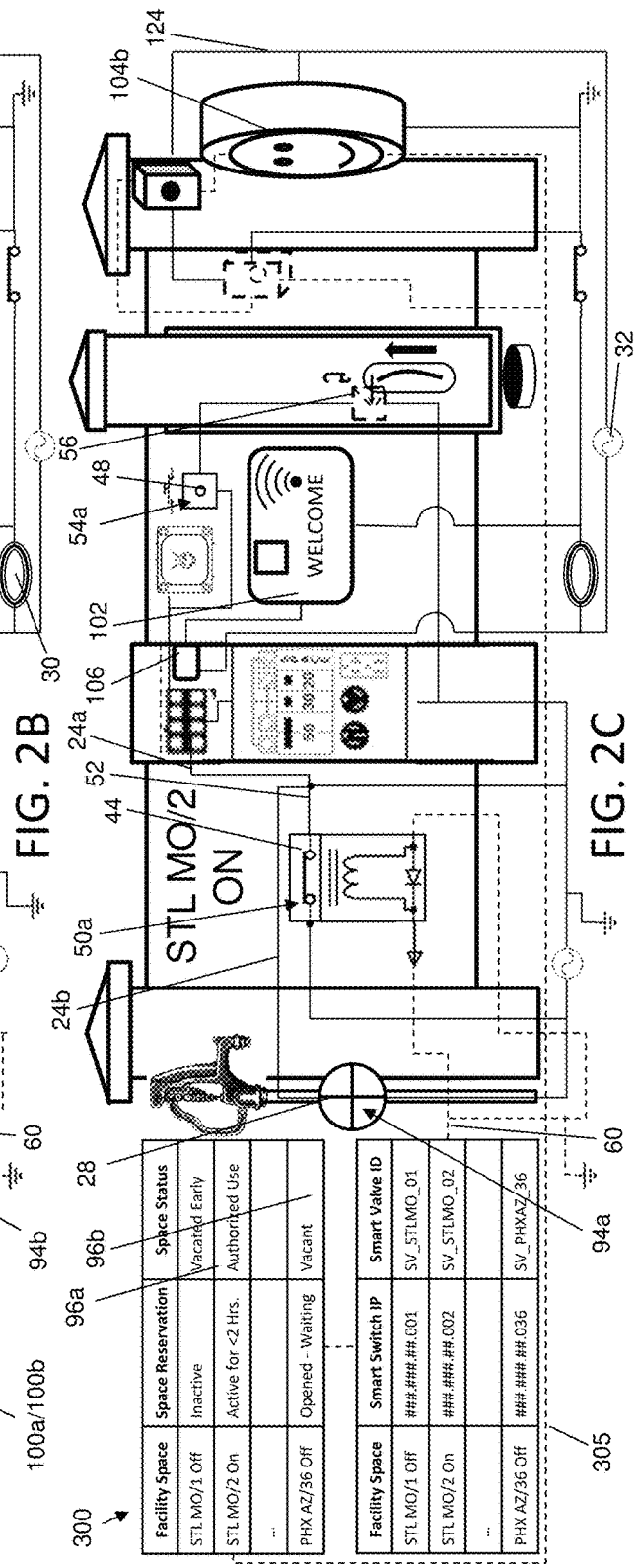
FIG. 2B
FIG. 2C

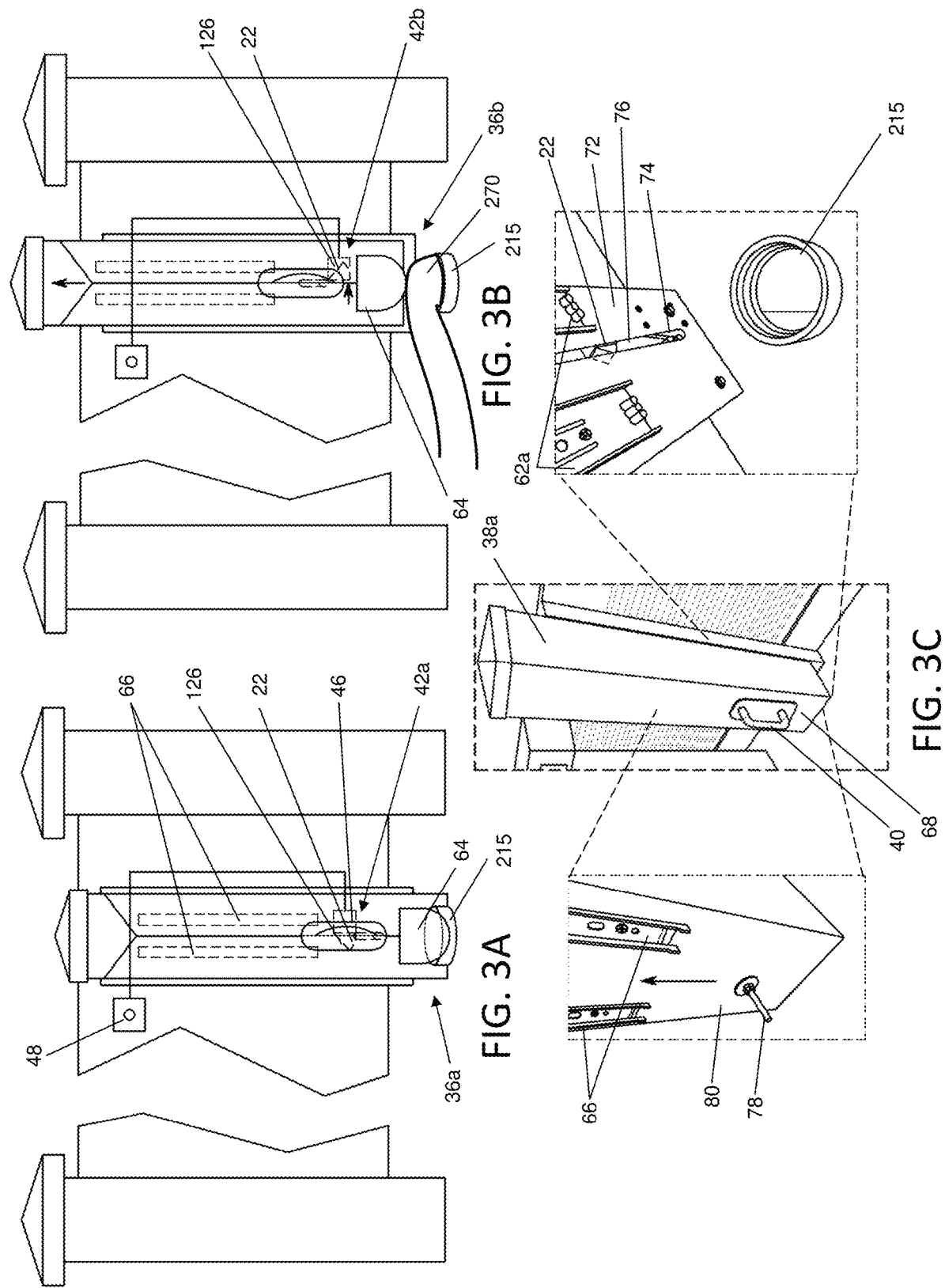

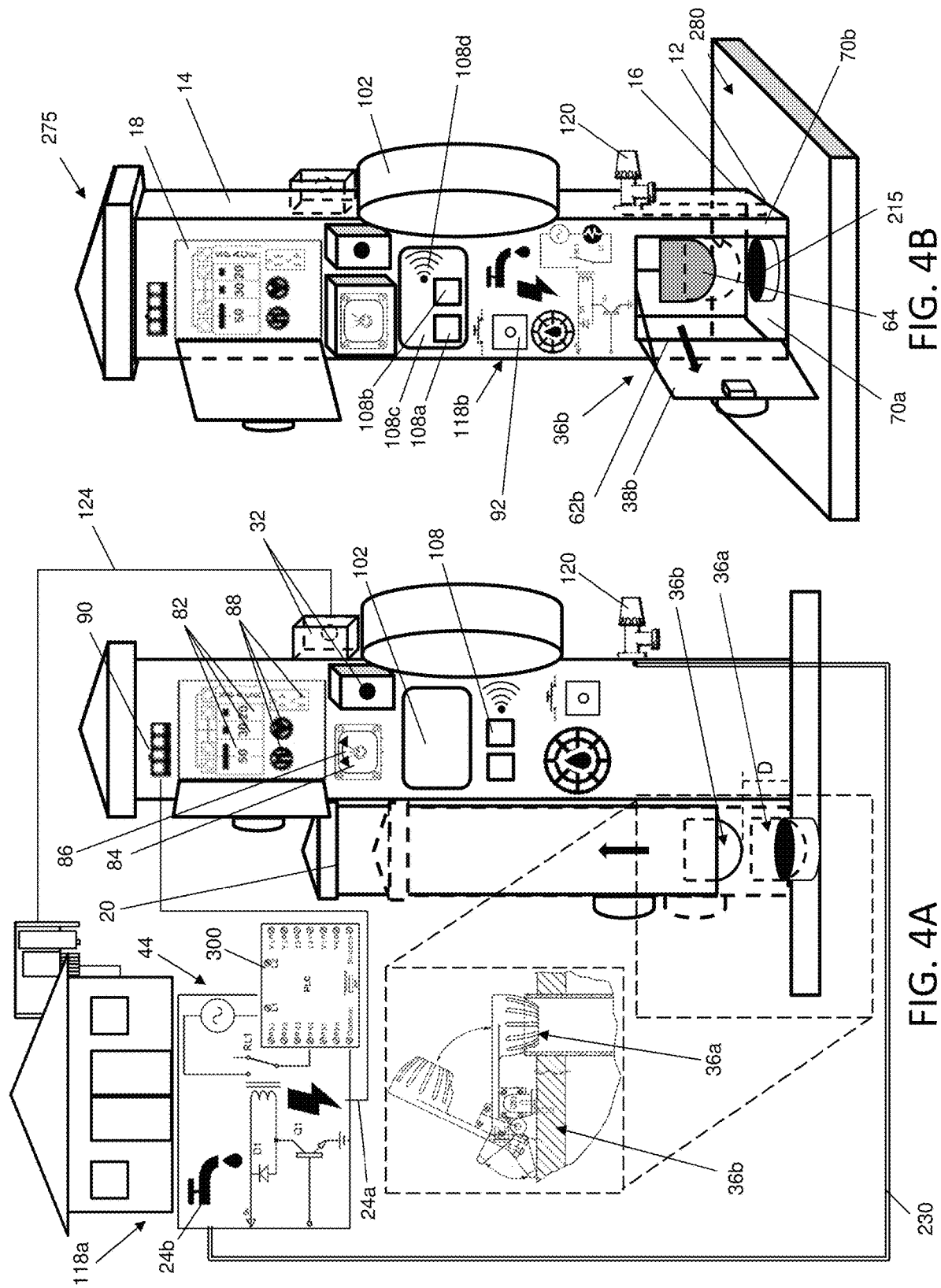

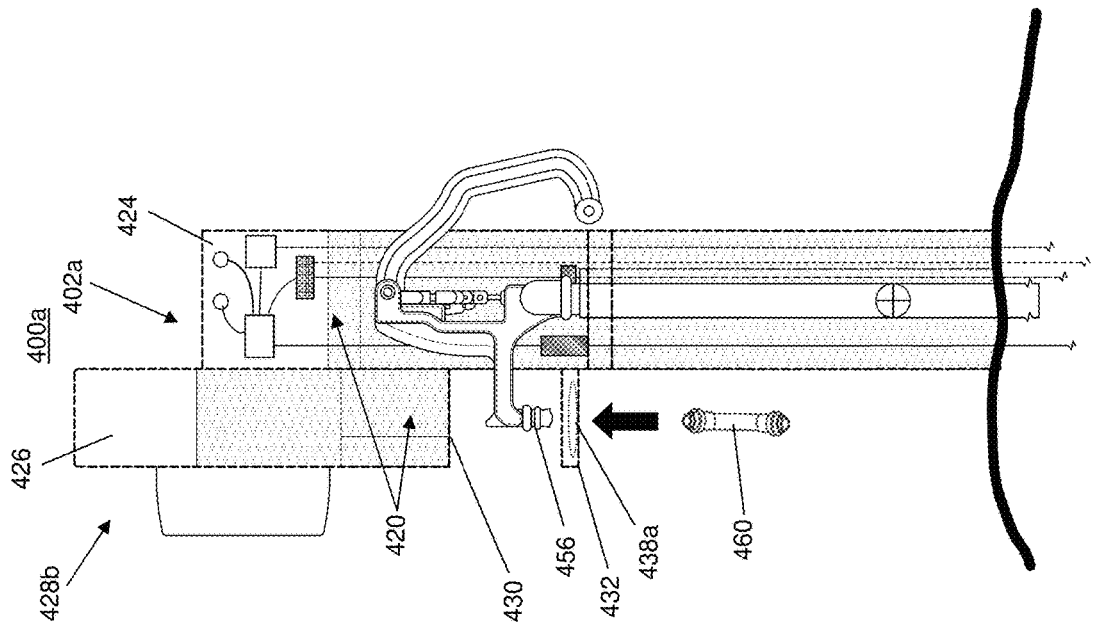
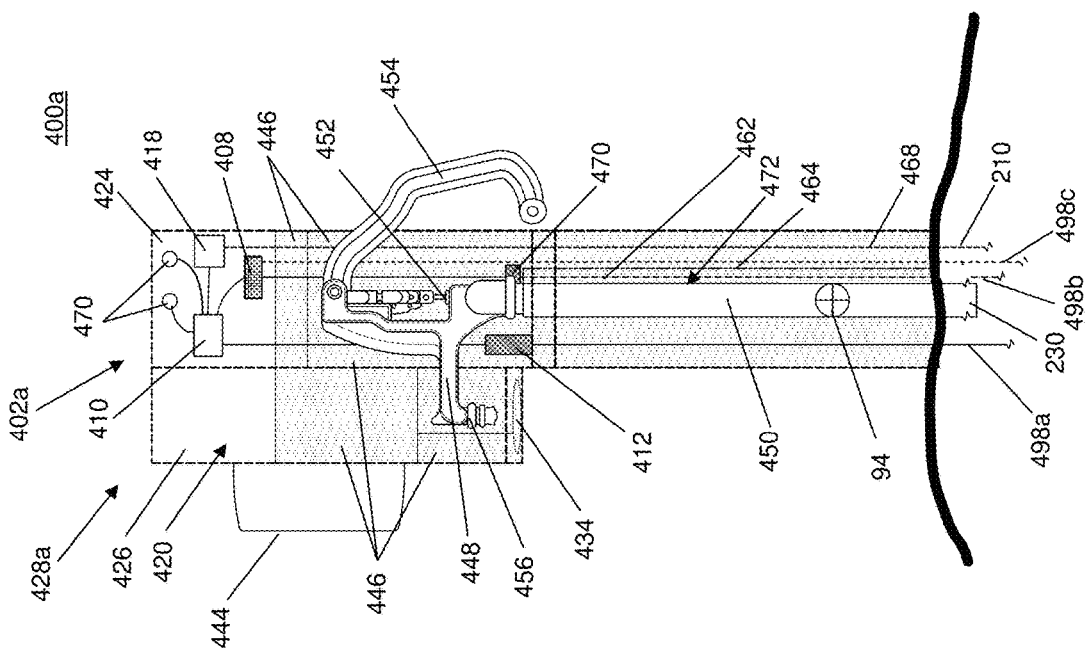

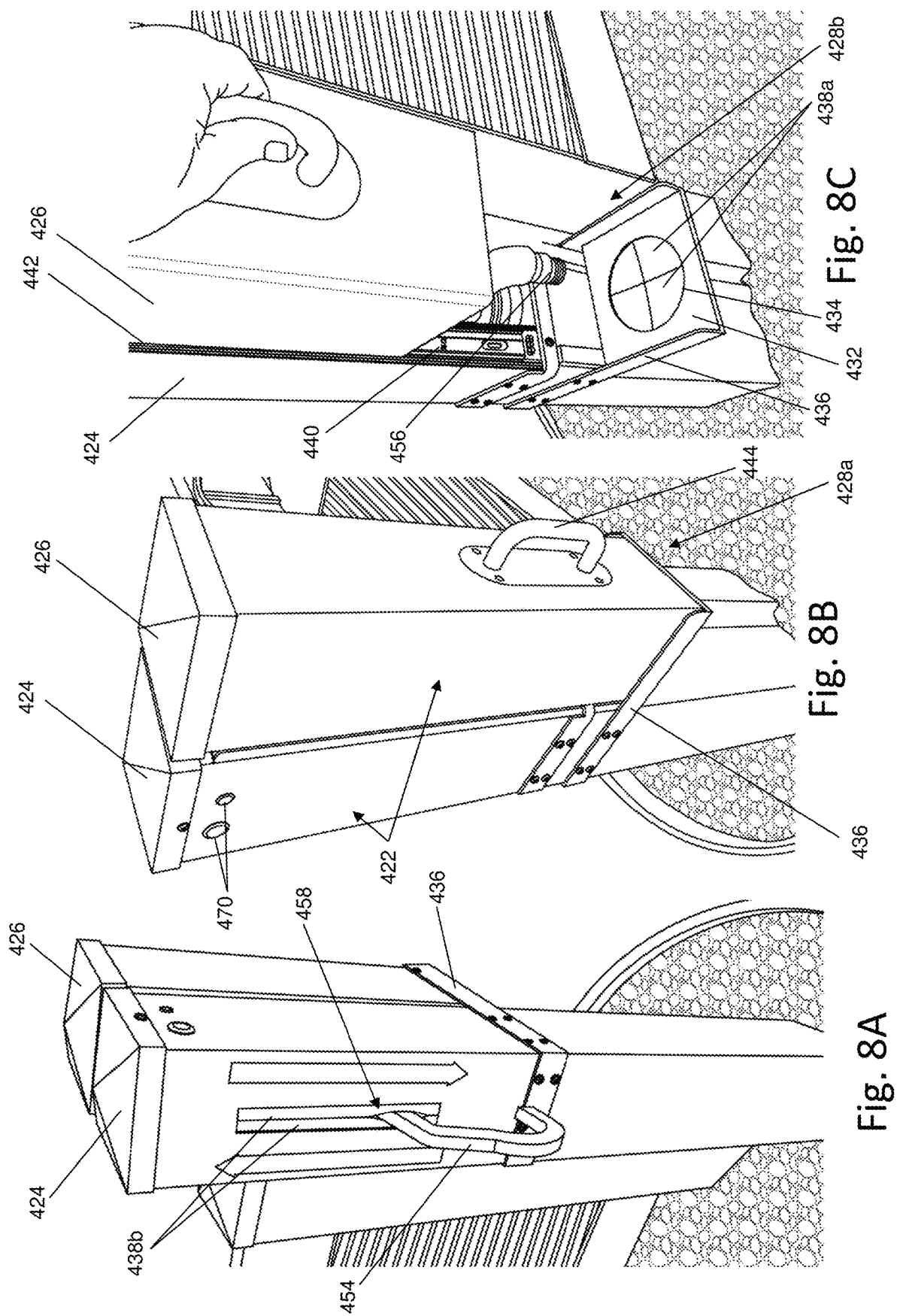

AUTOMATED CONTROLLING COLD WEATHER HYDRANT INTEGRATED INTO RECREATIONAL VEHICLE PARKING FACILITY

CROSS-REFERENCE TO RELATED APPLICATIONS

This application claims priority from U.S. Provisional Patent Application No. 63/291,546 filed Dec. 20, 2021 and is a continuation-in-part of U.S. patent application Ser. No. 17/567,293 filed on Jan. 3, 2022 which is a continuation-in-part of U.S. patent application Ser. No. 17/245,266 filed on Apr. 30, 2021 and issued as U.S. Pat. No. 11,215,958 on Jan. 4, 2022 which claims priority from U.S. Provisional Pat. App. Ser. No. 63/018,441 filed on Apr. 30, 2020, which are each hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to a water hydrant, and more particularly to a remotely monitored cold weather hydrant assembly.

Related Art

Traditional parking facilities for recreational vehicles (RVs) have multiservice hookup pedestals which provide utility services with connections to electrical power, potable water, and sewer access. Examples of multiservice hookup pedestals are described in U.S. Pat. Nos. 6,844,716 and 9,048,636 which are incorporated by reference. Additionally, many of these RV parking facilities have automated reservation systems that allow guests to select a parking site with arrival and departure times and to pay in advance for the period of time that the parking site is being rented. Most of these RV parking facilities have an onsite manager, attendant or other staff who can prevent unauthorized users (freeloaders) from accessing parking sites that have been reserved by the paying guests and who direct the guest to their reserved parking site. The attendant may also activate the utility services that are provided through the particular hookup pedestal for the reserved parking site. As explained below, some hookup pedestals also allow for self-service operation with an automated activation when a user is at the parking facility and pays for the parking site through a local terminal. These self-service hookup pedestals allow the user to activate the utility services for a period of time without the need for an onsite attendant, but they are not integrated with an automated reservation system.

Parking facilities have used automated and remote monitoring with reservation systems and self-service-payment kiosks for decades, and these parking facilities have incorporated sensors that detect the locations of vehicles in parking spaces and/or the occupancy status of particular parking spaces, such as disclosed in U.S. Pat. No. 5,432,508. Parking facilities have also been known to include self-service hookup pedestals that provide utility services, such as the electrical power hookup pedestals in U.S. Pat. No. 5,451,755 which suggests the benefits of providing an electric power outlet for trailer camping. Similarly, US Pat. App. Pub. No. 2008/0304212 discloses an automated self-service hookup pedestal for electrical services which can be operated by a driver who pulls into the RV parking facility. However, the '755 Patent and '212 Application require payment at a local kiosk or central transaction interface point in order to activate the utility services through the hookup pedestal, and there is no system which integrates the automated reservation and parking system functionality with the activation of multiservice hookup pedestals corresponding with respective reservations. Accordingly, modifications would need to be made to automated parking facilities with reservation systems to integrate multiservice hookup pedestals that are activated when a guest arrives without any need for an attendant; additionally, for such an integration, known hookup pedestals would also have to be modified.

Even with the advances and innovations that have been made to automate the management of recreational vehicle parking facilities, there has remained a need for improved hookup pedestals that can be integrated with automated reservation and remote control systems. In addition to the automated self-service hookup pedestals for electric power referred to above, there have also been self-service hookup pedestals for other utility services, such as sewer service. For example, U.S. Pat. No. 9,010,358 discloses a self-service control panel that operates a locking inlet cover for an automated dump station. According to the '358 Patent, the inlet cover has an electrically powered latching mechanism, and when a payment is made, the control panel powers the latching mechanism so that it is unlocked for a short, limited period of time which gives the user sufficient time to open the inlet cover and connect the end of the RV's waste hose into the dump station's inlet tube in the space between the open inlet cover and the inlet tube (on the order of a couple of minutes). When the waste hose is connected to the inlet tube, it prevents the inlet cover from closing which is critical because at the end of the short time period the latching mechanism is moved back to its locked configuration, and the entire operation to empty the RV's waste tank(s) takes longer than the short time period provided for opening the inlet cover and placing the waste hose into position over the inlet tube.

The '358 Patent is particularly directed to an automated dump station that is separate from the RV parking site which has the hookup pedestal that is used for ongoing utility services while the RV is parked for a long period of time, on the order of hours, days, or weeks. Accordingly, the self-service, automated dump station service disclosed in the '358 Patent is not integrated with the other utility services. If the self-service, automated dump station was to be integrated into a hookup pedestal with other utility services that are rented for hours, days or weeks, it is likely that the renter might want to empty the waste tanks at the beginning of the rental period as well as towards the end of the rental period, and for the longer rental periods, the waste tanks may need to be emptied multiple additional times. Without modification to the '358 Patent's dump station service, even if the inlet cover is unlocked for the first couple of minutes of the rental period and is opened during this short time for the initial placement of the waste hose, the renter would have to make additional payments for subsequent evacuations or would have to wedge the inlet door open which would allow odiferous and noxious fumes to escape from the waste pipe.

Wedging the inlet door open is also risky for the facility operator because while the renter may be on an excursion during the rental period, if the renter has wedged the inlet door open, a freeloader could use the dump station at the parking site. Accordingly, there remains a need to modify hookup pedestals so that all of the utility services are active and available for the entire duration of the rental period.

In a number of different industries, smart switches, such as disclosed in U.S. Pat. No. 6,002,340 which is incorporated by reference, have been integrated in a number of innovative ways with programmable logic controllers (PLCs), micro-controllers, sensors, and different types of electrically powered motors, solenoids, and other actuators for operating latches, valves, and other mechanisms that are used in control systems to provide automated, remote control operation for equipment corresponding to the particular industries. Although smart switches and sensors have been used for decades to remotely control electrical power systems, electronic communication systems, potable water systems, and sewage systems, the limited uses of smart switches and sensors in hookup pedestals have mostly focused on self-service systems in which a single utility service is automatically activated at the time that a payment is made at the hookup pedestal or at a central processing location at the particular parking facility. As indicated above, currently known self-service hookup pedestals cannot be integrated into automated reservation and remote control systems for multiple parking facilities without modifying their operation. Accordingly, there has also remained a need for improved hookup pedestals that can be distributed in one or more RV parking facilities and function in coordination with a central command console that manages the automated reservation system as well as the remote control systems.

Preferably, the improved hookup pedestals would provide for multiple utility services, particularly including electrical power systems, potable water systems, and sewage systems, which can be all be activated or deactivated based on the reservation information maintained by central command console as well as sensor information and/or user input from each particular hookup pedestal. It would be preferable for all of the utility service to be activated and de-activated automatically upon arrival and departure, respectively, of the guests who are the users of the services while the parking facilities are remotely managed and overseen by off-site staff without any onsite staff required. Although wireless communications may also be provided through the improved hookup pedestals, it is less important than electrical power, potable water, and sewer connections because of the ubiquitous use of smartphones over expansive mobile phone networks and ability to use a smartphone as a personal hotspot. Accordingly, in remote locations, it may be more beneficial to ensure the RV parking facility is within the operable range of a mobile phone tower or to build one as a part of the infrastructure for the RV parking facility.

As another improvement to multiservice hookup pedestals, a cold weather hydrant could be added considering a problem exists when water lines and spigots are susceptible to freezing when exposed to harsh cold temperatures for extended periods of time, such as in northern climates during winter months. Frost and freeze-resistant hydrants have been known for nearly a century, and new innovative variations continue to be invented for freeze resistant hydrants, including those described in U.S. Pat. No. 2,688,976 by Baker, U.S. Pat. No. 5,614,119 by Ollis, U.S. Pat. No. 6,216,722 by Solomon and U.S. Pat. No. 7,143,779 by Parker.

A common frost-proof hydrant design situates the control valve beneath the known freeze-line depth of the particular area where the hydrant is used. In operation, this configuration allows water to flow through the valve and out of the distribution pipe, above the freeze-line, when the valve is opened. When the valve is closed, water within the distribution pipe above the freeze-line drains from the pipe and the pipe above the freeze-line remains empty until the valve is opened. However, a problem arises when a hose or spray nozzle remains connected to the end of the distribution pipe and water fails to drain from the distribution pipe above the freeze-line. For example, a water hose connected to an RV or spray nozzle that is in the off position will prevent water from draining from the pipe which may subsequently freeze within the line. Any usage scenario that might prevent the water from draining out as intended by the design of a typical frost-proof hydrant thereby necessitates an alternative freeze-proof design. In particular, there is a desire to provide an improved design which protects against uneducated users who do not realize that a frost-proof hydrant cannot work when connected to a hose, such as an RV water line, when there is no flow of water through the hose.

Other inventions related to hydrants, water lines and spigots in the prior art have tried to stave off freezing through insulated and heated lines, such as described in the '119 Patent which combines an insulated housing and heating element. However, a problem remains as hydrants are often times in remote locations that are not easily monitored. If a failure occurs within the heating element, the unit may be susceptible to freezing unless someone happens to check the unit when it is down and the water within the line has not yet frozen. Further, powering the units and operating heating elements can be costly and is only necessary when the line is in use. Thus, there is a need to provide intermittent heating when the line is accessed by a user and which can be switched off when it is not in use so that power and costs associated therewith are not wasted.

The cold weather hydrant of the present invention could be used with the standard multiservice hookup pedestals or the improved multiservice hookup pedestals described herein or could be used by itself without any other services being provided.

SUMMARY OF THE INVENTION

The invention described herein is a cold weather water hydrant that is preferably integrated into the RV Self-Park utility pedestal and smart parking system but which could be used independently of the RV Self-Park system. The cold weather hydrant includes a standard water line and spigot, commonly used at RV parks and other areas where potable water is desired, and also incorporates a cold weather housing, heating element and central monitoring computer. The system thereby operates without freezing in cold weather settings and also notifies interested parties of system failures in the event that a failure occurs.

In one aspect of the invention, the cold weather hydrant includes a heating assembly that regulates the ambient air temperature within the interior space of the housing which surrounds the spigot and water line. In the preferred embodiment, the heating assembly includes a heating element and a thermostat which activates the heating element when the air temperature drops below a pre-set temperature threshold. Thus, water within the spigot and water line does not freeze regardless of the external temperature outside of the housing.

In another aspect of the invention, the cold weather hydrant is in remote communication with a monitoring computer that alerts interested parties about hydrant conditions and failures. Sensors within the housing monitor the air temperature and heating assembly operation such that alerts are created in the event that the air temperature drops below a warning temperature, if the heating assembly fails or if one or more of the sensors themselves fail. Thus, the hydrant automatically maintains the internal temperature within the housing to combat freezing and also alerts interested parties should a failure occur.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

FIGS. 2B and 2C are schematic representations of the multiservice hookup pedestal shown in FIG. 2A in an inactive state and in an active state, respectively.

FIGS. 3A and 3B are detail views of the sewer cover device for the multiservice hookup pedestal shown in FIG. 2A in a closed position and in an open position.

FIG. 3C is a perspective view of the sewer cover device with detail views of the mounting bracket and the sliding post.

FIGS. 4A and 4B are simplified schematic representations of alternative embodiments of the multiservice hookup pedestal according to the present invention.

FIGS. 7A and 7B are cross-sectional views showing the interior of a cold weather hydrant according to a first embodiment.

FIGS. 8A-8E are perspective views of the exterior of cold weather hydrant according to the first embodiment shown in FIGS. 7A and 7B.

DETAILED DESCRIPTION OF THE PREFERRED EMBODIMENTS

The following description of the preferred embodiment(s) is merely exemplary in nature and is in no way intended to limit the invention, its application, or uses.

Figure 1:
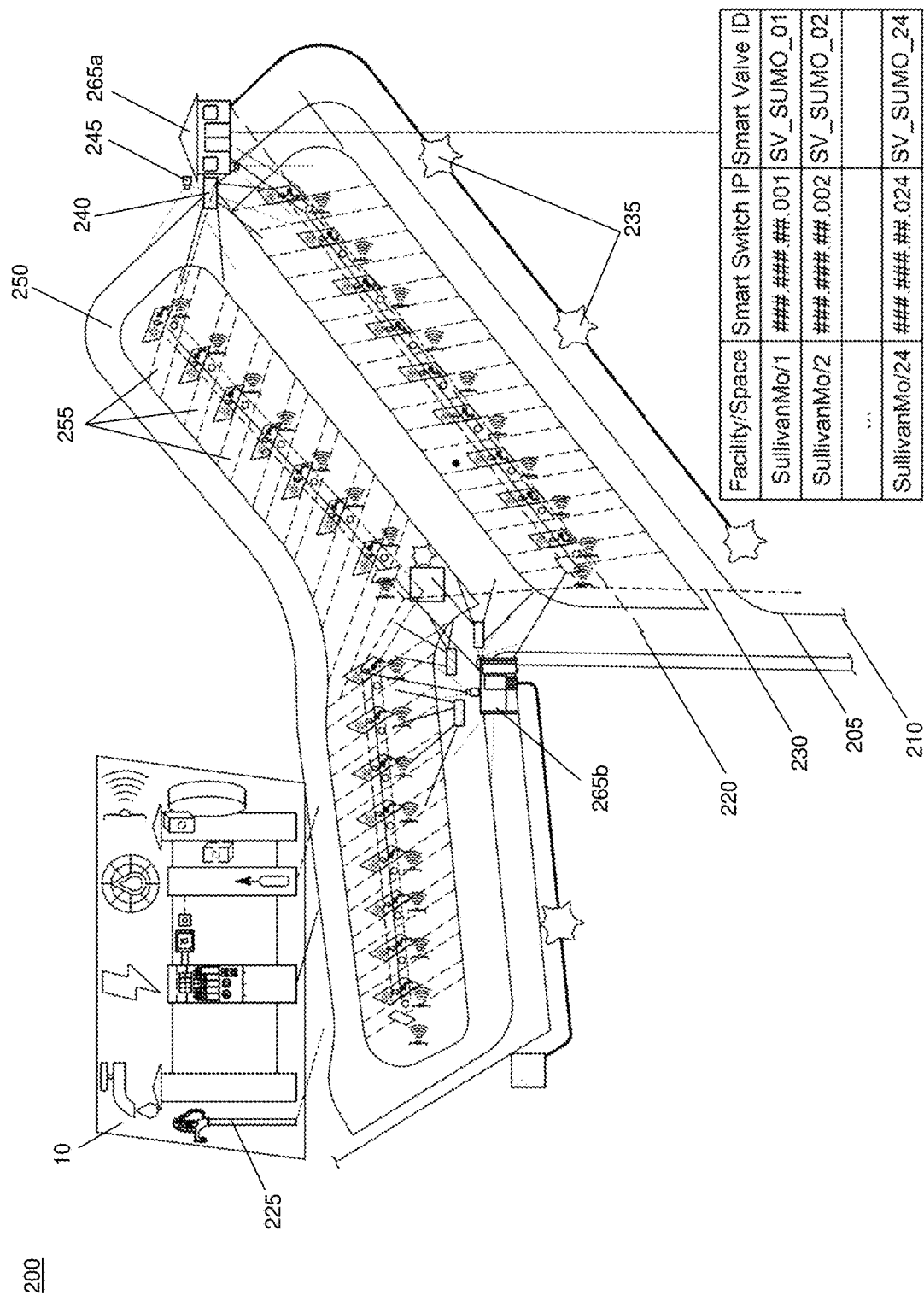
FIG. 1 is a schematic representation of an RV parking facility with infrastructure distribution systems for multiple services and multiservice hookup pedestals of the present invention.

The automated and remote control system for multiservice hookup pedestals allows for remote management of the reservations and hookup utility services at multiple recreational vehicle (RV) parking facilities throughout the United States and Canada. The physical integration of the multiservice hookup pedestals into the RV parking facility's infrastructure is shown in FIG. 1 as a part of a site map. Particular features and functions of the multiservice hookup pedestals are described in detail below with reference to FIGS. 2-4, and FIGS. 5A and 5B illustrate the integration of the multiservice hookup pedestals into an automated parking site reservation system and an automated control system for the activation and deactivation of the utility services that are provided through the corresponding multiservice hookup pedestals.

As will be evident from the description of the different embodiments of the hookup pedestals below, the improved structural features and automation elements in the multiservice hookup pedestals allow for the integration of automated activation and deactivation of the utility services that are available through the hookup pedestals and also allow for one or more remote attendants to override the automated controls for the hookup pedestals. It will be appreciated that the improved multiservice hookup pedestals can also be used in traditional RV parking facilities in which an attendant activates and deactivates hookup pedestals, such as by flipping physical switches on a control panel or virtual switches in a control software program which correspond to the respective hookup pedestals to provide the utility services.

The automated reservation software system used for multiple RV parking facilities in the present invention is similar to currently known automated reservation systems for parking facilities. Additionally, the functionality of RV parking facilities' physical infrastructure is similar to currently known ground-level RV parking facilities, although as discussed below, some features are modified to maximize the parking spaces for the size of the overall facility. For the reservation system, a computer software program automatically makes parking site reservations for guests according to the availability of parking sites at the RV parking facilities, provides rental agreements with the guests for the duration of their stays (number of hours, days, or weeks), and processes the rental payments for guests. The return receipt for each reservation preferably includes customized instructions for the individual guest for their specific stay, particularly including the parking site that will have the hookup services activated for their stay.

The unique features of the present invention allow the integration and use of the information from the automated reservation system with information from sensors and/or user inputs in an automated control system that activates and deactivates the utility services provided through the multiservice hookup pedestals using smart switches and smart valves along with manually actuated switches and manually actuated valves that are in series with the corresponding smart switches and smart valves, respectively. As used throughout this description of the invention, smart switches generally refer to electronically controllable switches and smart valves refer to an electrically actuated valve that is controlled by a smart switch. Accordingly, as described in detail below, the innovations for the present invention are primarily in the features and functionality of the multiservice hookup pedestal and in the components and operation of the control system. The control system includes one or more programmable logic controllers (PLCs) to process the reservation system information and the sensor information and determine whether or not an active status signal should be communicated to a particular multiservice hookup pedestal. When the PLC communicates the active status signal to the multiservice hookup pedestal receives, the smart switch and the smart valve are activated.

RV Parking Facility Infrastructure

As shown in FIG. 1, the RV parking facility's physical infrastructure 200 includes electrical lines 205, potable water mains 230, sewer waste pipes 220, lighting towers 235, wireless communication stations 240, video cameras 245 as well as the roads 250 and the RV parking spaces 255. Each RV parking site has the parking space for the RV along with an adjacent multiservice hookup pedestal; preferably, the hookup pedestals are positioned in service islands 260 that are slightly elevated from the surface of their corresponding parking spaces. The multiservice hookup pedestals each connect to the utility services that are provided to each one of the RV parking sites, namely, at least one electrical line transmissively connected to the electric power grid 210, a dump station inlet 215 fluidly connected to the sewer pipe, and a plumbing fixture 225 fluidly connected the potable water mains. The electric power lines are preferably contained in conduits along with communication/control wires that are connected to the sensors that are connected to or proximate to the hookup pedestals. The lines, wires, mains, pipes, and conduits for the utility services extend below and between the hookup pedestals and preferably extend to a control building 265a, and the electric power and communication/control conduits may also extend to an electric power distribution control box 265b that is separate from the control building. The control building preferably contains one or more programmable logic controllers (PLCs) 300 that are a part of the control system, and the electric power distribution control box may also have PLCs. The RV parking facility also preferably includes backlit instructional signage that can be used to provide instructions to guests, visitors, service providers, and others. In the alternative to a single control building, control and distribution points may be housed within a local control cabinet and electrical panel.

According to the different configurations of the hookup pedestals described in detail below, the smart switches and smart valves could be centrally located as a group at the parking facility proximate to the hookup pedestals but not within the hookup pedestal housings, such as in the control building. Alternatively, the smart switches and smart valves may be distributed to each of the hookup pedestals so they are located within the housings of the corresponding hookup pedestals. Each one of the smart switches and smart valves preferably has its own unique internet protocol (IP) address or other unique identifier. Accordingly, for those RV parking facilities which use hookup pedestals that each contain the smart switches and smart valves within their respective housings, the PLCs could be remotely located from the parking facilities so the computer control for multiple RV parking facilities could be centralized, and there may not be a need for a separate control building or electric power distribution control box at the individual parking facilities. It will also be appreciated that the sensors, smart switches, and smart valves could communicate wirelessly so instead of using communication/control wires extending to each one of the hookup pedestals to communicate with the PLC, these electronic devices would communicate through the wireless communication access points.

Although there may be some space in the parking facility that is used for communal services, such as a trash bin, a dog park, and possibly some vending machines, the area of the parking facility is preferably maximized for the space available to the RV parking sites. Accordingly, there is preferably no pool or shower house that could be shut down during a pandemic nor is there any store or clubhouse that would require an attendant or other onsite staff. To help maximize the use of the space for the RV parking sites, the parking sites are pull through from wide side roads with easy angles and nearly-level parking sites so there is no backing necessary anywhere in the parking facility. Additionally, the parking sites are preferably arranged in rows of parallel parking spaces with the corresponding adjacent multiservice hookup pedestals. The business model of the RV Self-Park® parking facilities is not a traditional campground type of facility in which the green spaces between parking sites are larger than the parking spaces. In comparison, the RV Self-Park® parking facilities would have small green spaces between the parking sites for the hookup pedestals, but the green spaces between adjacent parallel parking spaces would be narrower than the width of the parking spaces, and there may not be enough space for trees or campfires.

Additional infrastructure features of the RV parking facility also support the management, control, and safety of the guests, their vehicles, and the RV parking facility equipment and property. For example, video cameras are strategically positioned as are the WiFi access points for real-time monitoring and wireless communications throughout the parking facility. The camera wiring conduits extend around the periphery of the parking facility, and street lights are anchored with concrete bases. Video feeds from the cameras can be transmitted over a computer network to an offsite attendant for remote monitoring of the RV parking facility and can also be streamed online to the guests of the parking facility which also allows for private viewing of the images while guests remain within their parked vehicles. The video feed can also be shown on monitors behind the windows of the control building. The control building is securely locked to protect PLCs when they are located at each of the parking facilities as well as the smart switches and the smart valves when they are centrally grouped and other equipment for the facility that may be stored in the building. The control building could be a small shack that also includes an alarm system that would provide a notification to the offsite attendant when there has been unauthorized access to the building or some other violation has occurred; additionally, the RV parking facility may have one or more strobe warning lights that can flash if there has been a violation. When the electric power distribution control box is separate from the control building, the alarm system may also detect whether there has been any forced entry or other tampering issue with the security of the box; similarly, alarms could also be integrated into the hookup pedestals.

Multiservice Hookup Pedestal

Each multiservice hookup pedestal 10 has a base 12, a housing 14 that is connected to the base, and a mounting bracket 16 that can be connected to the base and/or the housing depending on the particular configuration of the hookup pedestal. The housing contains at least an electric outlet panel 18 that has one or more electrical outlets for the electric power service. An inlet cover 20 to the dump station inlet is connected to the mounting bracket, and a latch 22 to the inlet cover provides for controlled access to the sewer service. The inlet cover moves between a closed position 36*a* and an opened position 36*b*, blocking the dump station inlet in the closed position and spaced a distance (D) from the dump station inlet in the opened position. The latch has a locked configuration 42*a* that prevents the inlet cover from moving from the closed position to the opened position and an unlocked configuration 42*b* allows the inlet cover to move from the closed position to the opened position. The latch's configuration between the open and closed positions is preferably operated by an electrically powered latch actuator 46. The multiservice hookup pedestal also has a hydrant 120*a* with a spigot or faucet 120*b* and a manually actuated valve 120*c* that is connected to the potable water service through a water line.

Figure 2A:
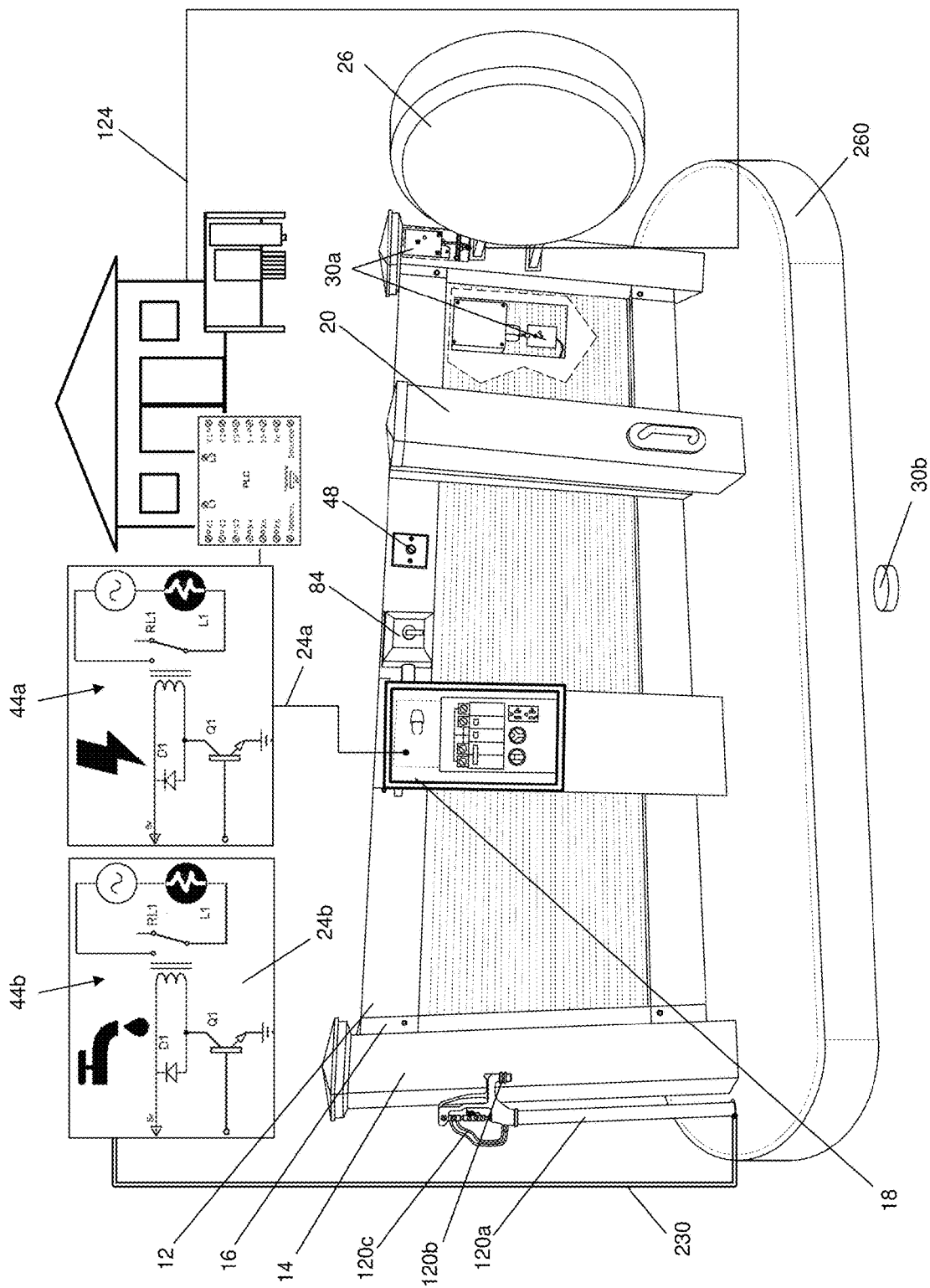
FIG. 2A is a perspective view of a first embodiment of the multiservice hookup pedestals according to the present invention.

As generally shown in FIG. 2A and particularly shown in FIGS. 2B and 2C, the multiservice hookup pedestal has multiple electric power circuits. The electric circuit 124 for the sensors that are used to determine the presence of a vehicle in the parking space is always powered, whereas the electric circuit 24*a* between the smart switch and the electric outlet panel (i.e., the electric service smart switch) is only powered when the PLC communicates the active status signal to the hookup pedestal's electric service smart switch. The latch actuator and the manually actuated switch 48 are also on the electric circuit with the electric outlet panel that is controlled by the electric service smart switch. Accordingly, the electric service smart switch 44*a* is in series on the electric circuit with the electrical power line on one side of the circuit and the electric outlet, the manually actuated switch, and the latch actuator on the other side of the circuit.

As shown in FIG. 2B, the smart switch is in its open state 50*b* which prevents any electric transmission from the electric line to the electric outlet panel, the manually actuated switch, and the latch actuator. The electric service smart switch is shown in its closed state 50*a* in FIG. 2C when the PLC provides the active status signal; in its closed state, the smart switch provides an electric transmission 52 from the electric line to the electric outlet panel and the manually actuated switch. The manually actuated switch is situated in series between the smart switch and the latch actuator, having an off-position 54*b* that keeps the circuit to the latch actuator open and prevents it from being powered by the electric transmission and having an on-position 54*a* that closes the circuit and provides the electric transmission to power the latch actuator. The latch actuator is operatively connected to the latch so that when the latch actuator is in its powered condition 56, it forces the latch to move between the locked configuration and the unlocked configuration.

As with other hookup pedestals, the electric power circuit includes a circuit breaker 90 and preferably includes multiple electrical outlets 88 and a rotary changeover switch 84 as an electric service selector 82. In particular, the electric service selector allows the guest to choose between 30/20 Amp electric power and 50 Amp electric power according to the corresponding knob positions 86 and the respective sets of electrical outlets. However, unlike other hookup pedestals, the electric power circuit also controls the electronically actuated latch that holds the inlet cover over the dump station inlet as described above. It will be appreciated that the use of the smart switch in combination with the manually actuated switch to selectively power the electronically actuated latch for the inlet cover could be incorporated into existing hookup pedestals as an improvement. For example, the hinged inlet cover disclosed in the '358 Patent could be modified according to aspects of the present invention to use the manually actuated switch and incorporated into the hookup pedestal disclosed in the '212 Published Application. It will also be appreciated that there could be other inlet covers, latch mechanisms, and release switches that would provide the sewer lockdown feature of the present invention. For example, as shown in the alternative view of FIG. 4A, a hinged inlet cover may rotate between the lowered position and the raised position such as disclosed in the '358 Patent and could have a latch that rotates toward and away from the inlet cover or could have a latch that extends and retracts like a deadbolt. In another alternative hookup pedestal configuration, an access door 38*b* on a hinge 62*b* could serve as the inlet cover, such as shown in FIG. 4B. Accordingly, different types of electrically actuated latches could be used with various types of inlet covers.

The smart switches are preferably operated by multi-channel relay controllers for single pole double throw (SPDT) solid state switches and preferably use a standard communication protocol, such as I2C serial communication. The preferred operation of the smart switches allows for chaining together relay controllers as well as sensors and other electrical equipment, such as pulse width modulated (PWM) drivers. The relays are biased-open 58 in their nonconducting open state when the PLC does not provide the electrical relay signal 60 corresponding with the active status of the smart switch. As explained above, the smart switches can be located in the control building or electric power distribution control box at the parking facility proximate to the hookup pedestals or within the housing of the hookup pedestal.

The latch is preferably biased by a spring 126 to its locked configuration with the moving portion of the latch is forced outwards relative to the housing. The latch actuator is preferably a solenoid that is positioned within the housing and forces the latch to its unlocked configuration when the solenoid is powered. In operation, when the PLC provides the active status signal, the smart switch allows the transmission of the electrical power to the manually actuated switch which is preferably biased open to the off-position, such as with a spring-loaded pushbutton switch 92. Since the pushbutton switch is biased open 58, the latch actuator remains unpowered until the pushbutton switch is depressed to the on-position to close the circuit and power the solenoid. When the latch is unlocked, the inlet cover can be moved to its open position. The pushbutton switch preferably has a light that is lit when the electric service smart switch is in its closed state so that there is a visual indicator to the guest that the electrical power has reached the pushbutton switch even when it is in the off-position, and the latch to the inlet cover can be unlocked by depressing the pushbutton switch to its on-position. Additionally, it will also be understood that a spring-loaded toggle switch or any other biased-open manually actuated switch could be used in place of the pushbutton switch to release the latch.

Another smart switch 44*b* in communication with the PLC is used to control the electrically actuated valve to create a smart valve 28. The smart switch is situated in series between the electrical power line and the electrically actuated valve. When PLC sends the active status signal to the smart switch, the smart switch is closed so that power is provided to the electrically actuated valve which moves the valve to an open flow state 94*a*. The electrically actuated valve is connected to and in fluid communication with the potable water service (i.e., water main) through the plumbing fixture 120. As with the electric service smart switch, the potable water smart switch can be located within the hookup pedestal's housing or can be within the control building at the parking facility proximate to the multiservice hookup pedestals. Accordingly, the smart valve can be located in the control building at the beginning or in the hookup pedestal's housing the end of the water line running from the control housing to the corresponding hookup pedestal. Regardless of location of the smart valve, the hookup pedestal has a water line within its housing that connects to the manually actuated valve so the manually actuated valve is fluidly connected to the smart valve. When the electrically actuated valve is in its closed flow state 94b, there is no water flow to the manually actuated valve, and when the electrically actuated valve is in the open flow state, the manually actuated valve has a range of flow rates between a no-flow rate and a full-flow rate, inclusive.

Rather than opening or closing a smart valve with a single solenoid, the smart valve preferably uses an electric motor which actuates the valve mechanism to be either in the open state or a closed state. An example of a smart valve with an electric motor is described in U.S. Pat. No. 9,057,453 which is incorporated by reference. Once the valve has been placed into its desired state, electrical power is no longer needed to the electric motor. In comparison, in a valve that is biased closed or biased open and uses, the single solenoid would have to be continually powered to change the state of the valve from its biased state of operation. It will be appreciated that a valve mechanism that is neither biased open nor biased closed could be actuated open by one solenoid and actuated closed by another solenoid so that the solenoids only need to be powered when changing the state of the valve, similar to the electric motor. Accordingly, the second smart switch in the second electric power circuit 24b powers the electrically actuated valve to a closed flow state when the programmable logic controller either provides an inactive status signal 100a or does not provide an active status signal 100b. As in the '453 Patent, the PLC may send an open-valve signal or a close-valve signal to place the smart valve in either a flow configuration or a shut configuration, either allowing water to flow from the water main to the manually actuated valve at the respective water spigot in the activated hookup pedestal or preventing the flow. It will be appreciated that just as the smart valve can use an electric motor drive to actuate the valve mechanism, an electric motor can be used to open the inlet cover, and in such a case, it would be preferred for the manually actuated switch to either release the inlet cover so it rests on the elbow end of the waste hose to hold the hose in place while it is connected to the dump station inlet or reverse the motor and close inlet cover to prevent the escape of odiferous and noxious fumes when the waste hose is removed from the dump station inlet.

The vehicle sensor 30 and a micro-processor communicate 34 with the PLC and are connected to at least one of the base, the housing, and the bracket. As explained above, the vehicle sensor and the micro-processor are electrically connected to the electrical power line in a separate electrical circuit without regard to any status signal provided by the PLC to the smart switch for the electric service provided through the multiservice hookup pedestal. The vehicle sensor determines a vacant status 96a or an occupied status 96b as the parking site occupancy status in the parking space proximate to the vehicle sensor, and the vehicle sensor communicates the parking site occupancy status to the PLC. The multiservice hookup pedestal may use different types of vehicle sensors, such as a pair of through-beam sensors, an in-ground sensor, a machine vision sensor, and/or an infrared reflective sensor.

As particularly shown in FIGS. 2A-2C, a pair of through-beam sensors 30a are combined with an in-ground sensor 30b. The in-ground sensor is preferably a magnetic sensor operating in association with vehicle detection algorithms as is generally known for parking facilities. The through-beam sensors operate in pairs with one of the sensors being attached to the front side of the hookup pedestal and facing forward towards the parking space corresponding with the hookup pedestal on which the through-beam sensor is mounted while the other through-beam sensor is attached to the back side of the hookup pedestal and facing backward towards the hookup pedestal in the adjacent parking site. For the parking site at the end of the row where there is no parking site adjacent to the backside of the hookup pedestal, a separate post on the opposite side of the parking space holds the through-beam sensor that would have been on the back of the hookup pedestal on the adjacent parking site. Accordingly, it will be appreciated that the sensors for the parking space do not necessarily need to be attached to the hookup pedestal to which the sensor is associated for the determination of the parking site occupancy status.

Each one of the multiservice hookup pedestals is also equipped with a line-load sensor 32 that monitors the level of electrical power usage through the electrical panel at the corresponding RV parking site. Traditionally, hookup pedestals for electrical power service use line-load sensors and/or an energy meter when a user prepays for a particular amount of energy, such as in the '755 Patent, so the amount of energy supplied through the hookup pedestal is limited according to the amount that has been purchased. As explained below with regard to the automatic control system of the present invention, the line-load sensor of the present invention is used in a different way. According to the present invention, the level of electrical power usage according to the line-load sensor is evaluated along with the remaining time in a reservation window and the parking site occupancy status to determine the availability of the parking site for the automated reservation system.

The multiservice hookup pedestal can also include a parking site status sign 26 which communicates with the micro-processor and/or the PLC to provide different visual indicators 104 depending on whether the parking site is vacant or has either an authorized occupant 104b or an unauthorized occupant 104a. For example, the micro-processor or PLC may determine an unauthorized vehicle condition for the parking site when the parking site occupancy status is the occupied status, but the PLC has not provided the active status signal. When the parking site is vacant, the parking site status sign may be unlit or lit with white light, and the parking site status sign can be lit with a green light for the authorized occupant and or a flashing red light for the unauthorized occupant. Since the parking site status sign functions even when the PLC has not provided the active status signal, it is evident that the parking site status sign is electrically connected to the electrical power line on the same electrical circuit as the sensors, i.e., without regard to any status signal provided by the PLC. It will also be appreciated that there could be a display screen 102 on the multiservice hookup pedestal which provides messages depending on the occupancy determination for the parking site. In combination with the visual indication provided by the parking site status sign, a speaker 106 could provide an audible warning of the unauthorized vehicle condition.

The multiservice hookup pedestal may also include a user interface device 108, such as a keypad entry 108a, a credit card reader 108b, a touchscreen display 108c, and/or a wireless communication module 108d that can be used to positively confirm an arrival of an authorized guest and may also be used when the guest has completed the stay and is departing. The user interface device is electrically connected to the electrical power line on the same electrical circuit as the sensors, i.e., without regard to any status signal provided by the PLC, and when the positive user identification is input into the user interface device, the user input devices communicate the information to the PLC.

The multiservice hookup pedestals shown in FIGS. 2 and 4A has the water hydrant and the inlet cover on opposite sides of the housing for the electrical outlet housing. In the multiservice hookup pedestal shown in FIG. 2, the water hydrant is spaced from the inlet cover by a distance that is greater than the height of the electrical outlet housing. This embodiment of the hookup pedestal has posts on opposite ends with a half-wall panel connected to the posts and between the posts. The span of the half-wall panel is more than twice the height of the posts. Preferably, the posts are made from a vinyl plastic material that is preferably reinforced with metal. It will be appreciated that the posts may be made out of other materials, including other elastomeric materials, composite materials, and/or metals, such as aluminum. Similarly, the half-wall panel, housing, brackets, and other structural elements can be made from sturdy, weather-resistant materials.

As explained above, the multiservice hookup pedestals have an innovative lockdown feature for the inlet cover that limits the access to the dump station inlet that only allows for the release of the inlet cover when the smart switch for the electric power service is activated. Generally, when the control system provides power to the hookup pedestal, the electric circuit to the manually actuated switch is powered so the guest can operate the manually actuated switch to unlock the latch and open the inlet cover. When the inlet cover is opened, the waste hose 270 from the RV is placed into the space between the inlet cover and the opening to the dump station inlet and can be connected to the inlet end of the sewer waste pipe. The inlet cover can be lowered onto the elbow end of the waste hose to hold it in place. Preferably, when the spring-loaded switch is released, it moves back to the off-position and electric power is immediately cut to the latch actuator so the latch is biased back into its locking configuration. Accordingly, in the preferred embodiment, the cover should be raised while the power is on and the latch is released so the locking mechanism in the cover is raised past the latch, and the waste hose elbow is placed over the dump station inlet under the cover, preventing the inlet cover from lowering back onto the dump station inlet with the latch again locking. It will also be appreciated that the spring-loaded switch may also be connected to a relay with a timer which closes the circuit to the actuator for a set period of time as in the '358 Patent. When the waste hose is removed from the space between the cover and the opening to the dump station inlet, the cover is lowered back down to onto the inlet and the latch again locks the cover in its closed position. According to the features of the present invention, at any time during the reservation window when the smart switch is activated, the manually actuated switch can be moved to the on-position to activate the latch actuator and release the inlet cover.

According to the particular embodiment of the hookup pedestal shown in FIGS. 3A-3C, the inlet cover is a post 38a that slides on the mounting bracket between the lowered position 36a and the raised position 36b. The post is larger in size than the dump station inlet so the bottom end of the post surrounds the dump station inlet when the post is in the lowered position. The mounting bracket is a track 62a that is attached to a panel section 72 that is fastened to the half-wall panel between the end posts. The inlet cover post has a runner 66 that slides relative to the track, a handle 40 connected to an exterior side 68 of the post, and a plug 64 held within an interior space 70a in a bottom section 70b of the post. The plug can be attached by fasteners in the bottom section or it can be hung by chains from an upper section of the post. Regardless of how the plug is attached to the post, it is situated in the dump station inlet when the post is lowered into the closed position and is spaced from the dump station inlet when the post is raised into the opened position. The panel section preferably has an open slot 74 to its interior space 76. The housing for the latch and latch actuator is fastened to the panel section within the interior space, and the post has a bar 78 extending from its outer surface 80 through the slot into the interior space of the panel. As shown in FIG. 3A, the bar is held below the latch when the post is lowered to the closed position with the latch in the locked configuration. As shown in FIG. 3B, the bar is permitted to slide above the latch when the latch is in the unlocked configuration, allowing the post to be raised into the opened position.

More compact configurations of the multiservice hookup pedestal are shown in FIGS. 4A and 4B. Although these compact configurations are shown in a tower arrangement 275, with the height of the hookup pedestal being greater than the width of the hookup pedestal and the base of the hookup pedestals securely fastened to a concrete pad 280, it will be appreciated that the structural arrangement of the equipment and the spacing between the water spigot and dump station inlet as well as their spacing from the electrical panel can vary. According to the preferred embodiment of the latch actuator described above, the manually actuated switch is positioned within reach of the inlet cover's handle. Of course, if the latch actuator is a motor as suggested above, the manually actuated switch can be located beyond the reach of the inlet cover's handle. As shown in FIG. 4A, different types of inlet covers can be used with the hookup pedestal according to the innovative aspects of the invention as described above. In particular, the sliding post described above and the hinged inlet cover disclosed in the '358 Patent are different types of inlet covers that can be integrated into the multiservice hookup pedestal. As illustrated in FIG. 4A, the smart switches and smart valves for the entire set of multiservice hookup pedestals at the parking facility can be physically located together 118a in the control building as described above. Alternatively, as shown in FIG. 4B and also described above, the multiservice hookup pedestals can contain their respective smart switches and/or smart valves within their corresponding housings 118b.

In those multiservice hookup pedestals which contain the relay controller for the smart switch and the smart valve within the hookup pedestal's housing along with the electrically actuated valve, the weather-resistant housing is important to protect the electronic components against the elements. It will also be appreciated that in some environments, the extremes in the outside ambient temperature could be outside the operational temperature ranges for some of these electronic components, particularly including the relay controllers and/or electrically actuated valves. Accordingly, these fully integrated multiservice hookup pedestals may also have environmental control elements that would be found in the control building that house the groups of smart switches and smart valves and the PLC for the multiservice hookup pedestals, such as temperature sensors, heaters, and fans. It is expected that for many RV parking facilities, the centralized grouping of the smart switches and smart valves with the PLC in the control building will be the most efficient way to incorporate the smart switches and smart valves into the multiservice hookup pedestals.

The centralized grouping can be beneficial in retrofitting the multiservice hookup pedestals in existing RV parking facilities with smart switches and smart valves which would improve the automation of the hookup pedestals in the existing facilities. Retrofitting existing hookup pedestals for RV campgrounds and other RV parking facilities with the centralized grouping would improve the efficiency in controlling the hookup pedestals by an onsite attendant and would also allow the hookup pedestals to be controlled by an offsite attendant as in the preferred embodiments of the present invention. Similarly, the centralized grouping can be beneficial when adding the multiservice hookup pedestals to existing parking facilities belonging to service providers of related services that are regularly used by the RV community and already have one or more onsite buildings, such as fuel services and/or maintenance services.

As another application of the multiservice hookup pedestals with the centralized grouping of smart switches and smart valves in the control building, there are many large ground-level parking lots for retail stores which are usually empty at night, and the addition of the multiservice hookup pedestals to a portion of these parking lots in combination with the automated reservation system and automated control could allow guests to schedule short-term, overnight stays when the parking lots are otherwise not being used. Accordingly, the integration of the automated reservation system with the automated control system as generally explained above and described in more detail below for the multiservice hookup pedestals would be an improvement over current systems that are not integrated and do not allow for the automated reservation of parking sites combined with the automated control of the corresponding hookup pedestals. Regardless of the particular type of smart switches, electronically controlled relays, and smart valves used for multiservice hookup pedestals for the parking facility, the computer control program can operate remotely from the parking facility and can send signals to the smart switches and the smart valves through at least one computer control unit or PLC that is preferably housed in the control building or a control room of a building in an existing parking facility.

Automated Systems—Reservations & Control of Services

The computer software program for reserving the RV parking sites that are located at various RV parking facilities is similar to the automated reservation process that have been used for existing RV parking facilities and hospitality and travel services, such as hotels, rental properties, and rental cars. As indicated in the Related Art section above, it has been known for decades that parking facilities could combine automated and remote monitoring with reservation systems and self-service-payment kiosks, and it has also been known for decades that self-service hookup pedestals can be located at the parking sites. However, these known systems require payment at a local kiosk or central transaction interface point in order to activate the utility services through the hookup pedestal, and there is no system which integrates the automated reservation and parking system functionality with an automated control system to activate and deactivate the services available through multiservice hookup pedestals at the parking sites based on the reservation information and sensor information for the parking sites.

Figure 5A:
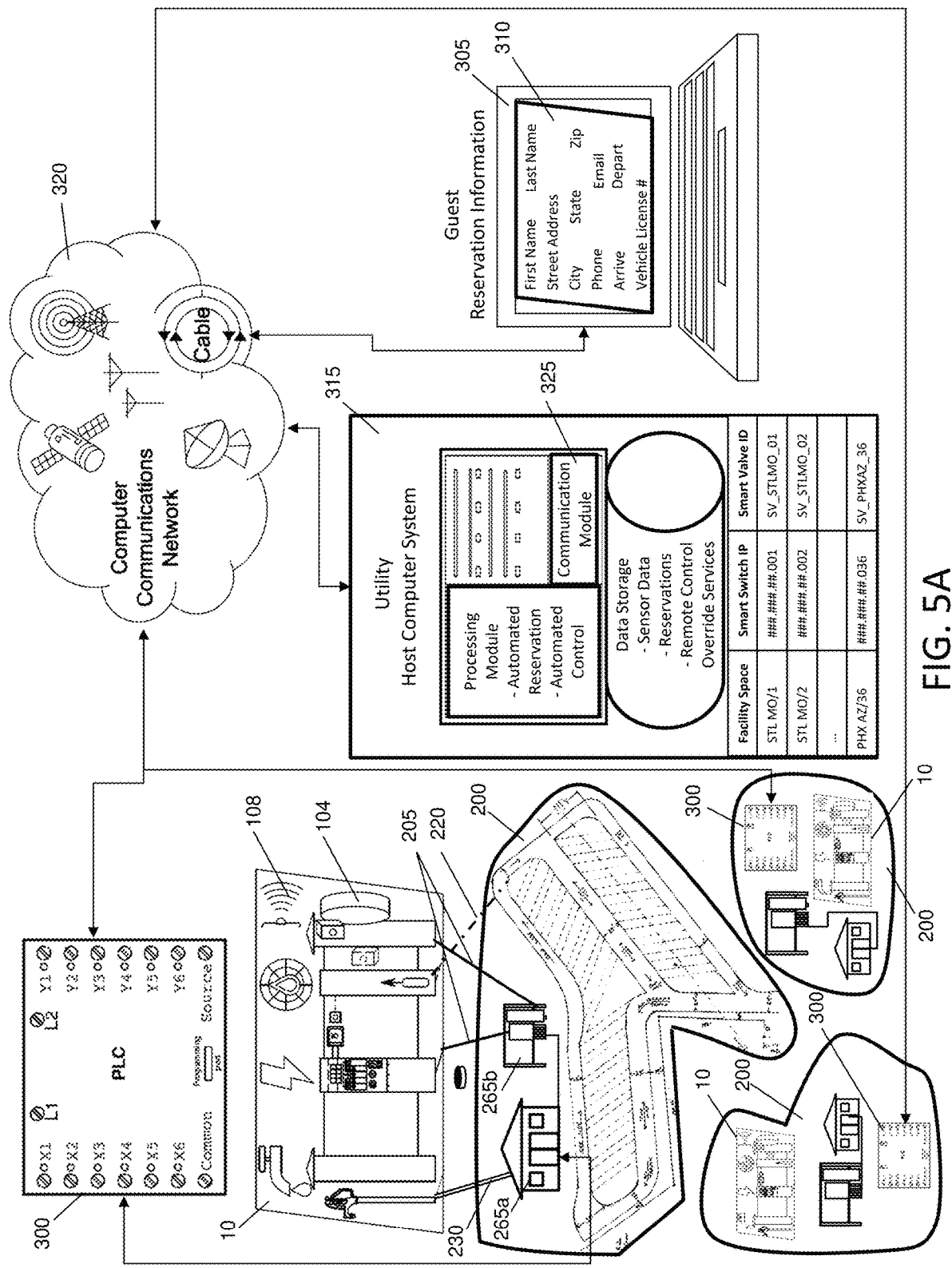
FIG. 5A is a diagram of the integrated automated reservation and control systems communicating with guests and multiservice hookup pedestals at RV parking facilities.

As with current automated reservation systems, guests use the automated reservation system 305 to make their reservations at the RV parking facilities. They can use the reservation system to complete rental agreements for the duration of their stays (number of hours, days, or weeks) and process their rental payments. As generally shown in FIG. 5A, the computerized reservation system has an online reservation portal screen 310 which receives reservation information from the guests through the online reservation portal screen. The computerized reservation system allows guests to select parking sites and the type of parking site (some parking sites have additional amenities to choose from such as a patio or, both, a patio and a gazebo) at the corresponding parking facilities according to the availability of parking sites that the reservation system automatically determines according to the information exchange with the respective guests.

Figure 5B:
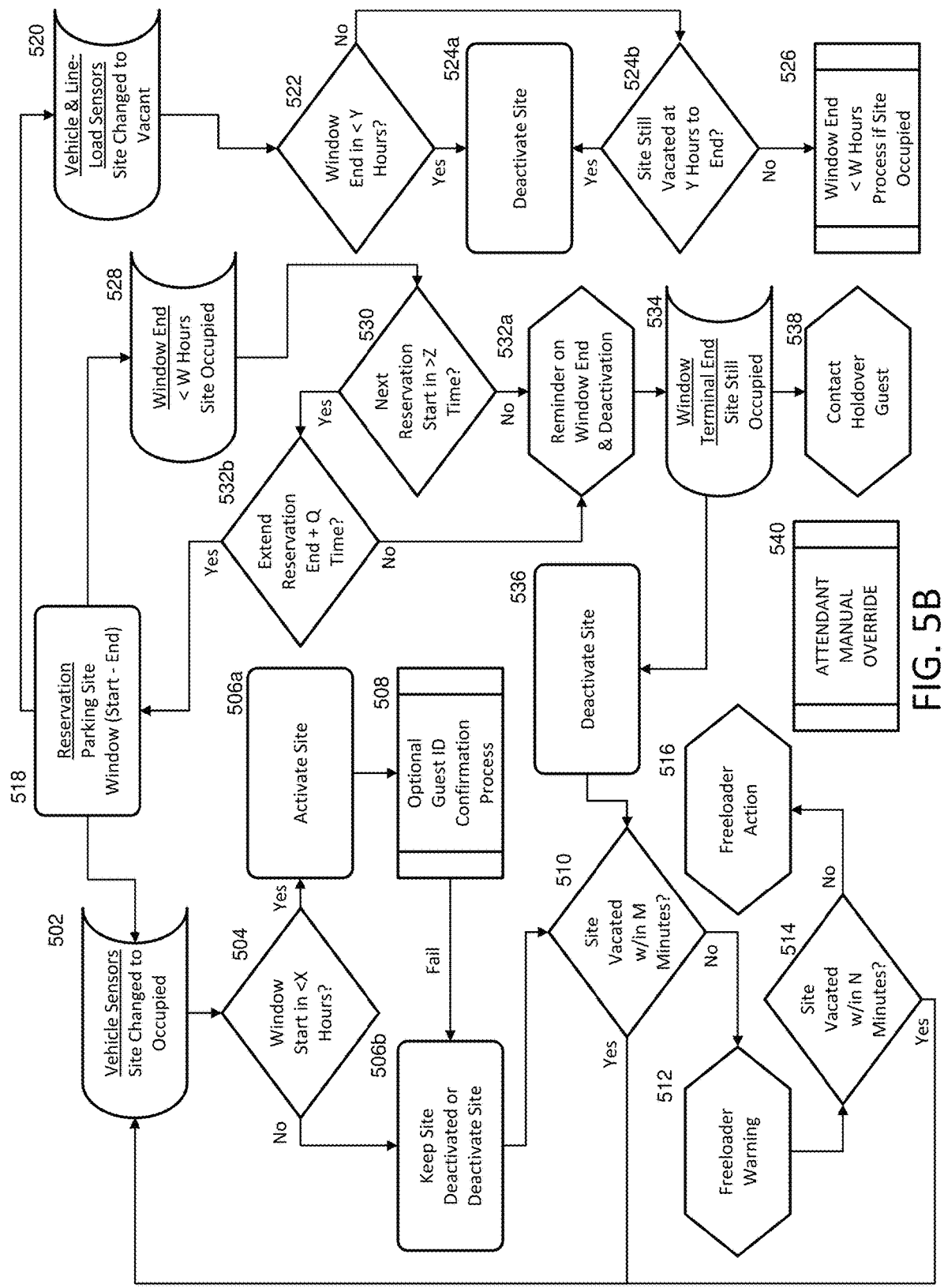
FIG. 5B is a flowchart of logic paths in the automated remote control system.

As indicated above and explained in further detail below, the automated control system 315 is in communication 320 with and uses the information from the computerized reservation system, the PLC for the smart switches and the smart valves, as well as the sensors at the parking facilities. In cooperation with the PLCs at the respective RV parking facilities, the automated control system automatically and remotely controls the utility services that are provided through the multiservice hookup pedestals via communication with the PLC(s). In particular, the communication module for the reservation system 325 and the control system is preferably located remotely from the parking facility and the corresponding parking sites and communicates with the PLCs over a networked system of computers, such as the internet. As shown in FIG. 5B, when a guest has made a reservation and arrives at their assigned parking site, the automated control system follows the logic path to confirm that the activation signal should be sent to the smart switch, electronically controlled relays, and smart valve for the hookup pedestal to activate the utility services. The attendant for the RV parking facilities is preferably located remotely from the facilities and has the authority to override the automated system for activating and deactivating the parking sites.

After having made a reservation through the reservation system, the guest receives a return receipt for the reservation which preferably includes customized instructions for the stay, particularly including the space that will have the hookup services activated for the duration of their reservation, i.e., from the start to the end of the reservation window. In addition to providing information that explains to the guest how to access the hookup services for their stay at the parking facility, the reservation return receipt preferably contains other information, including 1) a 24 hour emergency assistance number to call during any scenario of uncertainty where assistance becomes needed, 2) access to numerous security cameras located throughout the facility, and 3) one or more access codes to communal services available at the parking facility, such as an electric or mechanical locks for an onsite trash bin to dispose of trash or locks to the onsite dog park. The security cameras and emergency assistance number help the staff and guests resolve any scenario where assistance becomes needed and to provide peace of mind for visiting guests when walking about, tending to pets or sleeping in an otherwise new or strange, to them, environment. When necessary, staff has access to and can contact local service providers on behalf of guests, including RV repair facilities and equipment providers, private security businesses and police, and tow truck operators.

The staff and guests also have the option to have private video conferences regarding issues that may arise during their stay and may also conference in a service provider when necessary. It will also be appreciated that the software for the automated reservation system, the automated control system, and the security/issues resolution communications can be integrated into a single software system that has front end functionalities for the guests (i.e., reservation, service, and/or security requests) as well as the backend control functionalities for the staff (management and control of reservations and hookup services, additional service and/or security requests, and guest communications).

When the guest arrives at their designated RV parking facility and pulls into their assigned and rented parking site, the automated control system receives the occupied status information 502 from one or more vehicle sensors that monitor the parking site occupancy status and also checks the reservation information from the reservation program to confirm that the reservation window has begun for the parking site 504. Some guests may arrive a little early so the control system allows for this situation by accepting early arrivals for a reasonable period of time that the parking facilities manager(s) can set in their backend data entry to the control system. A default for an acceptable early arrival can be approximately thirty (30) minutes to a couple of hours or some other number of minutes or hours (time to window start<X hours) depending on the length of the stay and the end time for the previous guest that has reserved the space for the time period before the arriving guest. As will be evident from the logic paths explained below, guests that have longer reservation windows will be afforded extra considerations at the start and end of their reservation windows.

When the reservation window is either already opened, waiting for the guest, or the guest arrives within the early arrival period, the control system communicates with the PLC to send the active status signal for activating the smart switches and smart valves, thereby activating the utility services 506a through the multiservice hookup pedestal as described in detail above. The automated control system preferably uses internet communications and internet protocol (IP) addresses to activate and deactivate smart electric breaker/switches or other electronically controlled relays to activate electric current flow to the correct pedestal for electric power and smart valves for water hydrants that are situated at hookup pedestals in service islands that are adjacent to and preferably elevated from the respective parking sites. As explained in detail above, the activation of the smart switches for electric power also allows the guest to unlock the latch to the inlet cover using the manually actuated switch. The automated control system preferably uses secure communications (closed) with the smart switches and smart valves to automatically turn on the electric power and the water, respectively, at the hookup pedestal in the assigned parking site.

Although the control system preferably immediately activates the utility services when the occupied status is triggered by a vehicle within the reservation window and early arrival period, the control system may also require the arriving party to provide some form of positive identification confirming that they are the guest 508. This can be performed any number of ways, including the entry of information through a keypad, a reader, a touchscreen display, and/or a wireless communication module. With regard to wireless communication, if the guest has already registered their mobile phone with the reservation system or the guest has previously been a guest with the RV parking facility, the proximity feature of the smartphone can communicate wirelessly with the hookup pedestal's wireless access point or wireless sensor to automatically confirm the arrival. If the guest identification positive confirmation process is activated in the control system, if a positive identification fails to be made within a reasonable period of time after the arriving vehicle triggered the activation of the utility services, the parking site's utility services are deactivated and the possible freeloader process begins.

If a vehicle arrives at the parking site before the early arrival period for the next reservation window of fails the positive identification confirmation logic path, the control system will not activate the utility services through the hookup pedestal 506b. The arriving vehicle could still be the guest in which case, the guest can either access the automated reservation system to adjust their reservation window to the earlier arrival time or contact the attendant to request assistance and a possible manual override 540. However, it is also possible that a vehicle arriving at the parking site which does not have an open reservation window could be a traveler who is trying to use the parking space without reserving the space or paying for the utility services available at the parking site (i.e., freeloaders). It is also possible that the vehicle is for a guest who has reserved another parking site and accidentally pulled into the wrong parking site. The control system has a delay that waits for a short period of time, such as several minutes (M) that can be set in the backend data entry to the control system 510, and if the vehicle remains in the parking site, the control system automatically provides a warning to the potential freeloader 512. As described above for the hookup pedestal, the warning could be a flashing light and/or an audible notice. If there is a screen on the hookup pedestal, the control system could also provide instructions or messages that warn of the consequences for unauthorized parking. If the vehicle remains in the parking site for another period of time (N) 514 that may also be set in the backend data entry to the control system, a local towing company may be called to move the vehicle 516.

As described above, the backend of the control system's software integrates with the PLCs that control the smart switches and smart valves in the respective hookup pedestals. The front end of the software program allows guests to reserve sites and pay for their stay via an app on their smartphone or tablet computer or through a web-based software program on either of these electronic devices or through a laptop or other computer. It is also possible to provide a kiosk for guests to reserve any available parking site upon arrival. The sensors in the parking sites provide data to the automated control system to indicate arrivals that check in, vacancies on departure, potential overstays, and attempted freeloaders. Each scenario can be dealt with automatically in the computer program with the control of the hookup pedestals. For example, as shown in FIG. 5A, when reserving parking sites, guests enter their vehicle license number and the onsite sensors and cameras can serve as license plate readers so the system can automatically identify the guests' vehicles who have reserved their parking sites. The system preferably keeps a file of license plates for guests' vehicles to help the staff that is monitoring multiple facilities.

When it comes time for the departure of the vehicle and/or the end of the reservation window, the control system's software follows additional logic paths to deactivate the hookup pedestals in the parking sites when they are no longer being used. The software, either in the control software or the reservation software, can add any substantial time period before the start of the next scheduled reservation window back to the automated reservation system as time that is available for one or more intervening reservations. Accordingly, the automated control system also communicates with the reservation system when the vehicle sensors provide the vacant status information. When a vacancy has been detected using the vehicle sensors, the control system may also check the line-load sensor information to determine whether there remains an amperage draw through the electrical control panel 520. For some hitched trailers, it is possible to detach the trailer from the truck for an excursion or to get provisions at a store, and although the location of the trailer may not register with the vehicle sensors due to its location in the parking site relative to the sensors, the amperage draw would be indicative of the trailer being in the parking site. Accordingly, the line-load sensors can be a redundancy to the vehicle sensors and may also be checked periodically relative to the vehicle sensors to evaluate the reliability of the vehicle sensors.

When the sensors indicate that the parking site is vacant, the control system checks the reservation information for the parking site to determine whether the reservation is toward the end of the window 518. Just as some guests may arrive before the reservation window, it is also possible that guests could depart hours before the reservation window is at its end, and in some cases, the early departure could be one or more days early. For reservations that have a multiday window, when the reservation is in the final half day (Y hours), such as within the final ten (10), if there is a vacancy and no electricity is being used, the control system will determine that the parking site is vacant 522 and deactivate the utility services provided through the hookup pedestal 524a. For a reservation window that is less than one (1) day, an early departure determination could be made for departure that is less than the end departure period assigned to a multiday reservation window (time to window end<Y hours). For example, if the control system determines that there is a vacancy within the last six (6) hours of the smaller reservation window, the control system will determine that the parking site is vacant and 524b deactivate the utility services provided through the hookup pedestal. As with the other periods of time that are used and evaluated in the reservation and control systems, the times can be changed in the backend data entry, such as in a management dashboard for the reservation and/or control systems.

With the deactivation of the utility services for the parking site, the control system and/or reservation system can evaluate the time remaining before the start of the start of the window for the next scheduled reservation relative to a minimum reservation time period (Z hours) to determine whether there is sufficient time to schedule one or more intervening reservations. For example, if the minimum reservation time period is twelve (12) hours, and the last guest has departed early, if the next start of a reservation window greater than twelve (12) hours from the early termination of the last reservation window, there is sufficient time to provide a vacancy for the open time where there is no scheduled reservation. Preferably, the rental agreement includes a notice that if the site is left vacant for more than a certain period of time, the parking site can be considered open for another reservation.

Another logic path can be used for any holdover guests who have remained in their parking site past the end of their corresponding reservation windows. To help avoid this situation, when a guest's vehicle remains in the parking site towards the end of the reservation window (time to window end<W hours) 526, the control system and/or reservation system can automatically send the guest a reminder that the reservation window will end within the specified time period and that the utility services will be deactivated at that time 528. In the situation where the start of the next reservation for the parking site is greater than a specified time, such as the minimum reservation window (Z hours) 530, the guest can be offered the option to extend their reservation window 532a by some time that would be greater than the minimum reservation window and would be less than the time to start of the next reservation (Q time). If the guest pays for an extension to the reservation the end of the reservation window is adjusted accordingly 532b.

For any guest that is a holdover and remains in the parking site when the reservation window comes to its end 534, the control system deactivates the utility services provided through the hookup pedestal 536 and follows the same general process described above for a freeloader. The difference with the freeloader and the holdover guest is the reservation system has the contact information for the holdover guest; accordingly, at the same time that the utility services are deactivated, the attendant responsible for the RV parking facility with the holdover guest is provided with the holdover guest's contact information for a wellbeing check and resolve the holdover issue before the next guest arrives at the parking site 538. Of course, if there are other parking sites which are available (open but inactive) and the next guest for the parking site arrives before the holdover issue is resolved, the attendant can manually override the automated control system and activate the available open parking site for the next guest until the holdover issue is resolved. For any problem guests who have violated the terms of service for the parking facility and/or may be bothering other guests at the parking facility or otherwise creating a nuisance, a similar process can be used with a manual override to deactivate the utility services at the parking site and flash the warning light at the parking site.

The present invention solves a need for automated control of RV parking facilities that can be located in or very near major cities close to the interstate highways. The lack of such facilities makes it a challenge for transient RV travelers who want short-term parking sites along waypoints between longer-term destinations or who want to stay close to or within a city for attractions, business, or to be close to a loved one in a hospital. Most traditional campgrounds are almost always a significant distance from an interstate highway and larger cities because they mainly exist as destinations for those who camp at a campground or park there to visit other nearby natural recreational sites. Traditional campgrounds generally contain extra recreational aspects, such as swimming pools, shower houses, playgrounds, rivers, lakes, convenience stores and so on, which are not typically used by the transient RV travelers looking for a short-term stay between destinations or for a stay in or near a large city. The cost of land in and near large cities is at a premium, and these extra amenities result in additional costs for the land. Additionally, traditional campground with extra amenities requires a staff of people onsite to tend to all of the services and functions involved. Accordingly, by maximizing the use of the lot for RV parking and hookup services, minimizing the use of the lot for communal services, and automating the control of the utility services at the parking sites, thereby eliminating the need for onsite staff (i.e., remote control and automated systems), the present invention provides an option that had not been previously available because the lack of technology systems according to the present invention made such RV parking facilities financially untenable.

The automated systems and remote control features of the present invention significantly reduces labor costs and other costly services and functions from the base cost for parking with hookup services. The labor and cost savings allows RV parking facilities that use the present invention to operate in real estate locations of higher value that are closer to or within larger cities with higher traffic adjacent to major interstate highways where man-made attractions, restaurants, fueling stations, shopping and entertainment exists while being economically competitively priced when compared to a traditional campground parking site. Automation also allows for shorter term rentals, such as a twelve (12) hour rental period for transient travelers that want a safe place to sleep while parked in a parking site with full utility services in the hookup, rather than the traditional full day rental requirement.

The automated and remote control of the utility services provided through the hookup pedestals is also beneficial for using existing parking facilities of retail stores and service provides to the RV community who have enough space in their parking lots to add the multiservice hookup pedestals for the utility services. The innovative automated and remote control features of the present invention are also beneficial to retail stores and the service providers who may want to provide hookup pedestals with only electric utility service. Accordingly, for these nontraditional RV parking facilities that take advantage of the automation provided by the present invention, the vehicle sensors are extremely important. Rather than using a distributed set of sensors at each one of the parking sites, nontraditional RV parking facilities and even some RV parking facilities, including those that may be retrofitted, may want to use a centralized sensor array, such as machine vision that can positively identify when a parking site is vacant and when a parking site is occupied.

The automated functions of the present invention services can be modified to suit a particular need or desire. For example, as indicated above some parking facilities may want to positively identify guests when they arrive. In some cases, prior to activating the parking site, the system may automatically send a text message or email or may place an automated phone call or use other communication means with the expected guest to request a positive affirmation which confirms the expected guest is in vehicle that has arrived at the parking site. In addition to the positive identification examples described above, the automated systems of the present invention can provide the guest with a confirmation number upon the arrival of a vehicle, and if the vehicle belongs to the guest, they can enter the confirmation number through any of the means described above. As explained above, it is possible that an arrival may be an expected guest who has entered the wrong parking site and needs to be guided to the correct parking site. Additionally, it is possible that a guest at one parking site may be temporarily using another parking site for a secondary vehicle. Of course, it is also possible that the vehicle belongs to an attempted freeloader so the local towing company may be called.

In the potential freeloader situation discussed above, the system may notify an offsite attendant and automatically pull up the camera video feed for the parking facility that shows the parking site in question and may also guide the attendant in taking the appropriate action to have the vehicle moved to the correct parking site or removed entirely from the parking facility. Sometimes, a nearby guest might occupy part of another parking site in which case they will be contacted and dealt with appropriately. If it is an attempted freeloader, the local tow company can be called and possibly the local police depending on what is found when viewing the video record. Whatever the case may be, it all happens because of the vehicle sensors in the parking facility.

The automated system of the present invention enables guests to come to a parking facility without having to personally interact with anyone. Guests can reserve their parking sites, pay for the parking sites, enter into a user agreement, and receive their receipts and instructions for the entire transaction electronically. Guests can proceed directly to their assigned parking sites where power, water and sewer access are all made available to the guest automatically with a remote control system that operates in conjunction with local sensors and video cameras that monitor the parking facility and smart switches and smart valves. The hookup services continue to be provided to each guest for the time period of their reservation. Preferably, guests are allowed into the parking facility without encountering a gate or any barrier of any kind which allows for local delivery of food and other service providers or unhindered visits and appointments with local friends, family or business matters. Once onsite, the utilities become available automatically, and when the guest leaves there is no checkout required or obstacle to leaving at will. Guests can also purchase blocks of time to use at will in any park that they choose and that have a vacancy. The guests can come and go from the parking facilities on demand and would only pay for the time that they use. When buying blocks of time, the guests may be allowed a lower minimum time period for a stay. For example, if the standard minimum stay is twelve (12) hours, guests that pay for blocks of time may only be required to pay for two (2) hours. This might allow a guest to stop in a city and have a meal at a restaurant or to allow the driver and a passenger to cook a meal together while parked rather than having the passenger cook while the driver continues driving.

Although the preferred embodiment does not include a microphone or speaker in the hookup pedestal, such as described in US Pat. App. Pub. No. 2003/0004792, because the remote attendant would typically be speaking with the guests through their mobile phones, the microphone and speaker may be helpful in some sites so that the remote attendant can help guests who have not made a reservation online and can also warn trespassers to leave or their vehicle will be towed. Additionally, it will also be appreciated that aspects of the present invention could be used for other guests who reserve parking sites for their vehicles that require hookup services, such as boats at marinas and electric vehicles at hotels, restaurants, hospitals, sporting arenas, attractions, entertainment places, city, state or national parks, and all other waypoints. As a particular example of electric vehicles, the integrated automated reservation and control system combined with the hookup pedestal for electrical service (not even including the potable water service or sewer service) is an innovative improvement over the self-service point of purchase operations that are currently required.

There are numerous recreational vehicle parking facilities that could benefit from the advances of the present invention, including some facilities that are located in or near cities, facilities that are located along highways, facilities that are located around military bases, and even retrofitting and improving campground facilities such as Kampgrounds of America® (KOA) sites that may be in remote locations. It will be appreciated that the RV Self-Park® business model could be beneficially used by attractions, national parks, theme parks, resorts, stadiums, hospitals, RV service providers, and even retail stores that have large parking lots that are not always full and can change a portion of the lot for RV parking with the hookup pedestals and remote control and automated systems of the present invention.

Cold Weather Hydrant

A cold weather water hydrant 400 as shown in FIGS. 6-11 may also be incorporated into the multiservice pedestal described above or as a standalone unit in place of the traditional hydrant 120 described above. The cold weather hydrant includes a housing 402 holding a spigot assembly 404 that includes a water line 450 connected to the water main 230 and spigot head 448 having a spout 456, a valve 452 and a handle 454 for controlling the flow-rate from the hydrant. The cold weather hydrant allows users to access potable water during harsh environmental conditions when traditional water systems are at significant risk of freezing and becoming unusable. The water line and spigot head are contained within the interior space 420 of the housing which is preferably insulated with insulation material 446 that alone helps prevent the unit from freezing without the use of an external heat source unless outside temperatures drop well below the freezing point for an extended period of time. To allow the system to function in harsher climates that experience prolonged freezing temperatures where insulation alone may be insufficient, a heating assembly 406 is provided within the housing so that the ambient air within the housing surrounding the spigot assembly remains at or above a minimum temperature threshold 478a that is at least set on the thermostat 470 of the heating assembly, preferably a temperature at least a few degrees above the freezing point of water, such as thirty-eight degrees Fahrenheit (38° F.). As further explained below, the temperature minimum saved within the database of the central computer may be the same as the minimum temperature threshold set within the thermostat, but it is not necessary that they are equal or that the thermostat temperature is known to the monitoring system wherein the thermostat of the heating assembly and the monitoring system can operate independently of one another.

Figure 9:
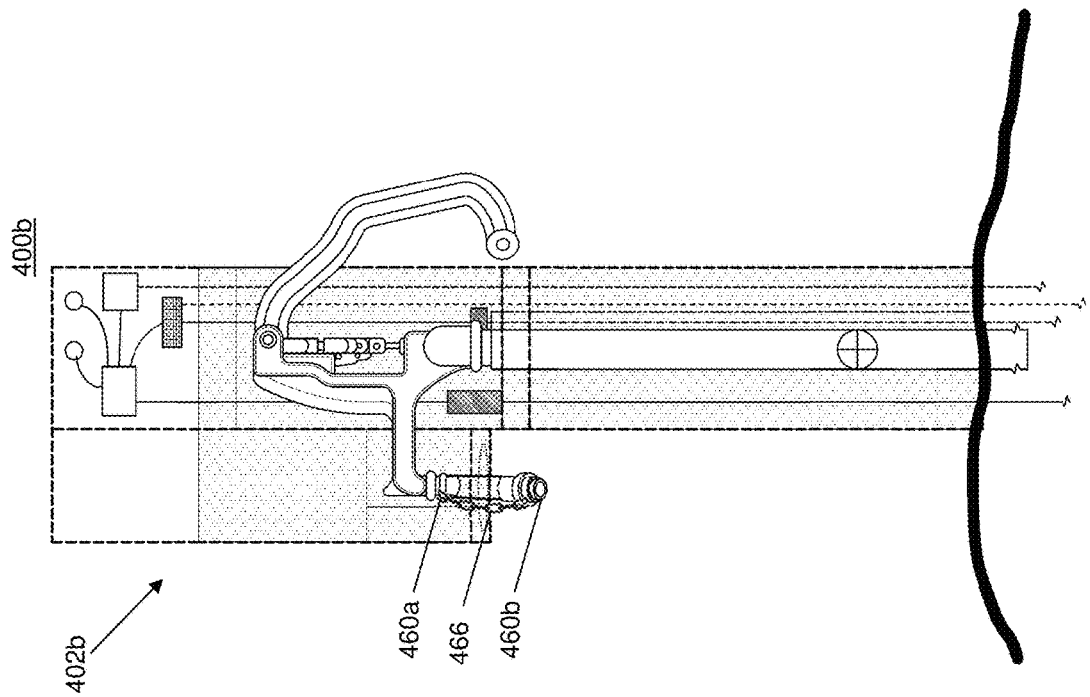
FIG. 9 is a cross-sectional view showing the interior of a cold weather hydrant according to a second embodiment.
Figure 11:
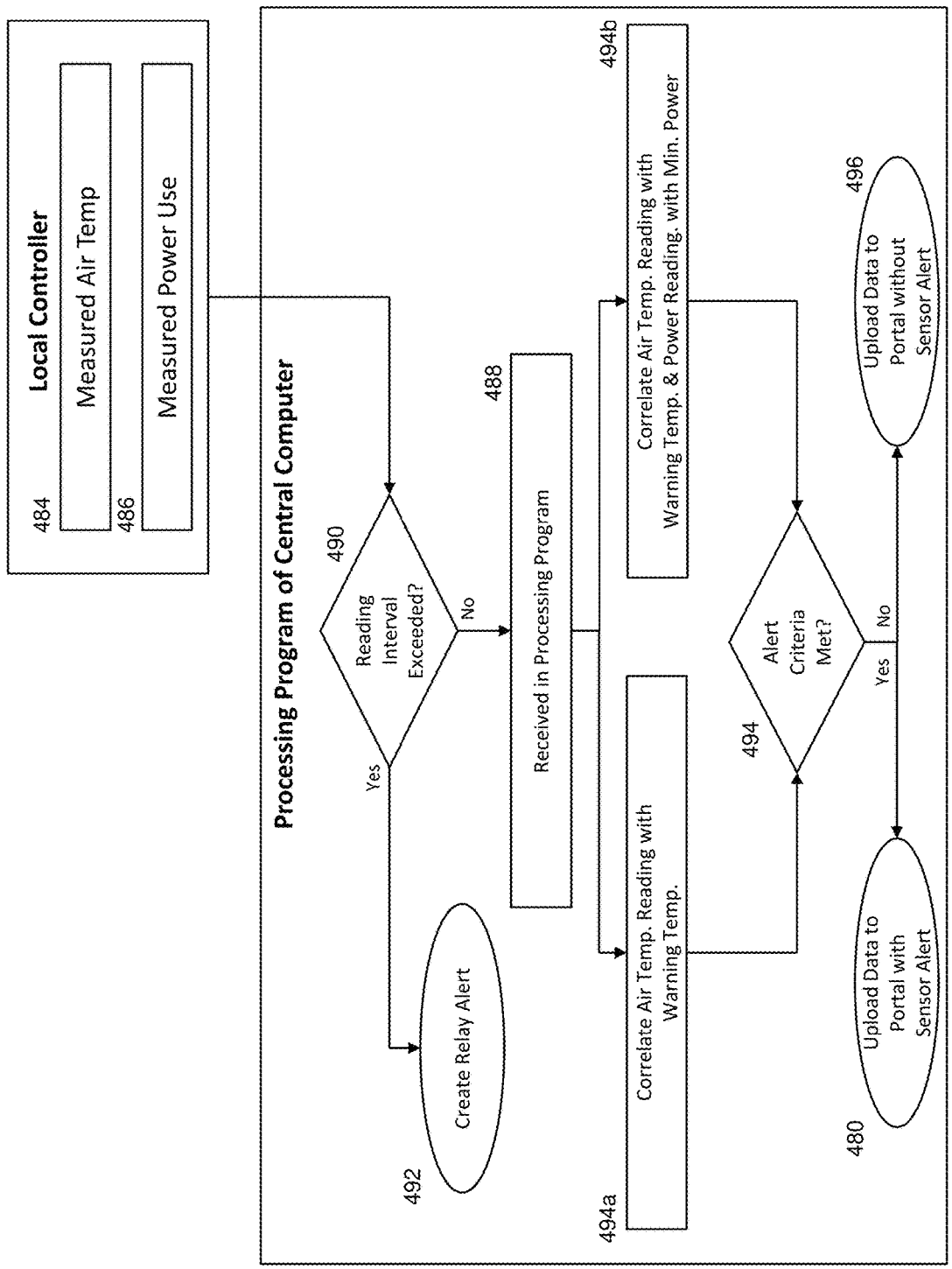
FIG. 11 is flow-chart of the cold weather hydrant alert system according to the preferred embodiment described herein.

In the preferred embodiment, the heating assembly 462 comprises heat tape situated within a conduit 464 that is positioned along the length of the water line within the housing, as shown in FIGS. 7 and 9. For better thermal transfer, the preferred conduit is made from copper but it is appreciated that other materials may be used. The combined heat tape and conduit allow for easier unit maintenance than other designs wherein the heat tape can be easily removed from the conduit for repair or replacement and subsequently slid back into the conduit that remains fixed in place within the housing, adjacent to the water line. Thus, the entire heating assembly does not need to be disassembled for repair which would take additional time and could lead to additional issues if the unit was not properly reassembled. Alternatively, it will be appreciated that other heating elements could be used without departing from the inventive aspects of the cold weather hydrant described herein, including heating tape positioned or wrapped directly around the water pipe without any conduit.

Figure 12:
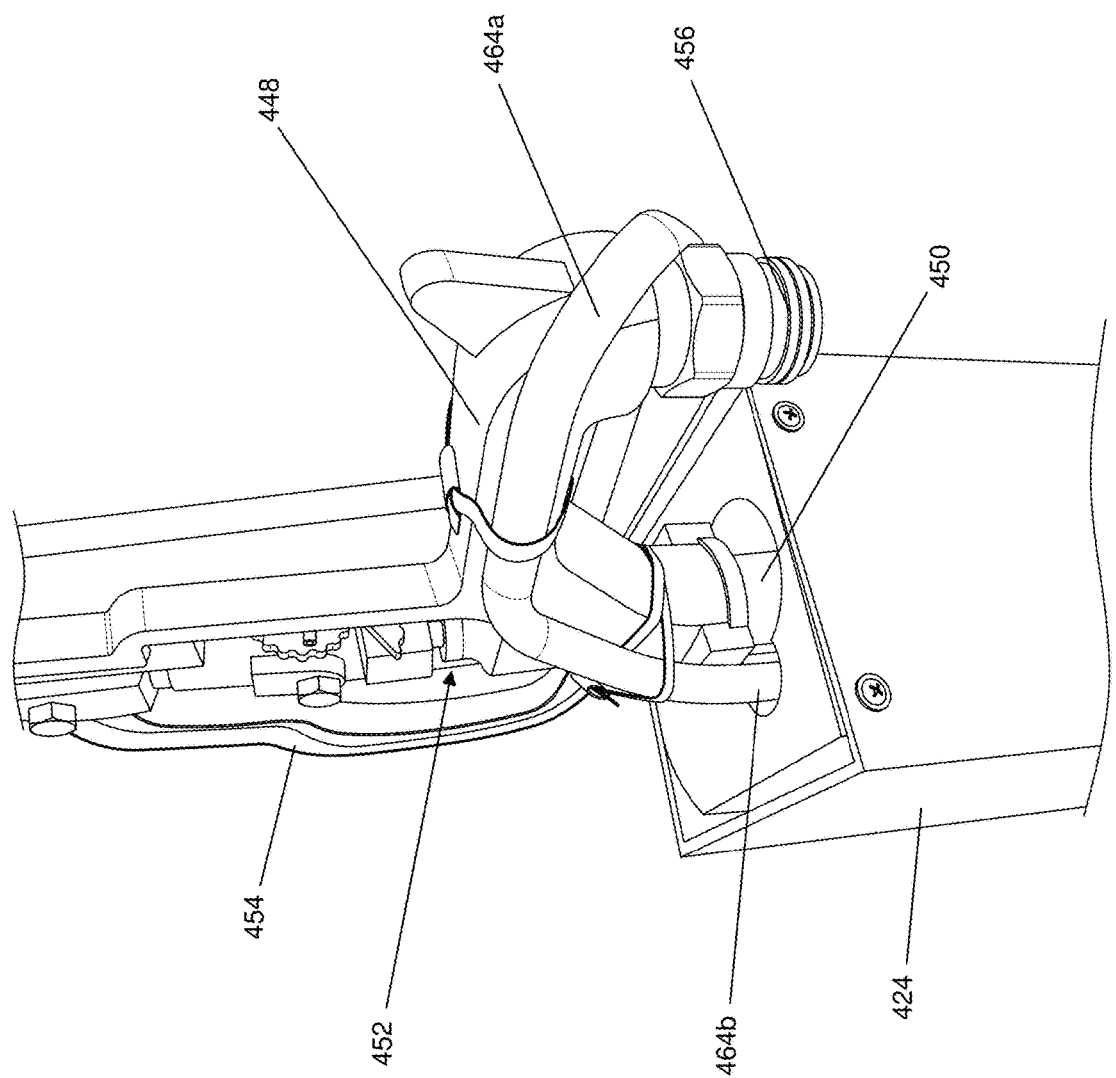
FIG. 12 is a detail view of the interior of a cold weather hydrant according to an aspect of the invention described herein.

In the alternative embodiment of the heating assembly illustrated in FIG. 12, a portion of the heating element is positioned next to the water line while another portion extends all the way along the head of the spigot around the spout. The construction of this alternative design includes a spiral extension 464a conduit portion which wraps around the head and spout that is attached to the vertical body 464b portion that extends to the ground along the water line within the main section of the housing. The U-shape of the spiral extension directs the conduit, and heat tape held therein, from its starting point within the main fixed section of the housing, around the spout and subsequently back into the vertical body that is situated next to the water line within the fixed section. Thus, the majority of the heating element, including the thermostat and sensors monitoring the heat tape are within the fixed section of the housing and only the spout and a portion of the heating element are within the section having the hose aperture, regardless of whether this section moves or is fixed according to the alternative embodiments described herein. Yet, the head and spout of the spigot that are more exposed to external temperatures given their proximity to the hose aperture can still be heated by the heating element.

Figure 6A:
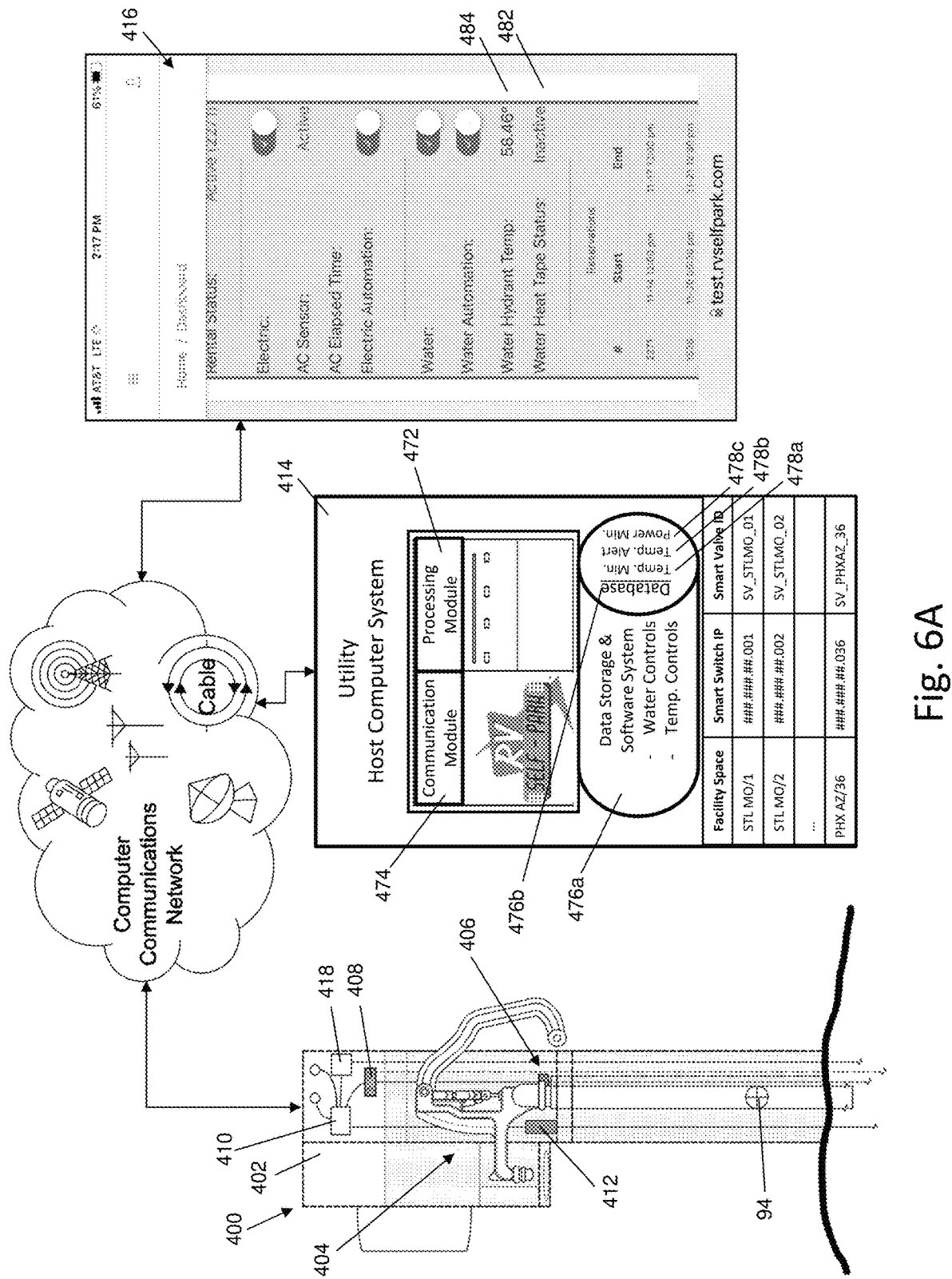
FIGS. 6A and 6B are schematic representations of a cold weather hydrant and a parking facility with a cold weather hydrant, respectively.
Figure 6B:
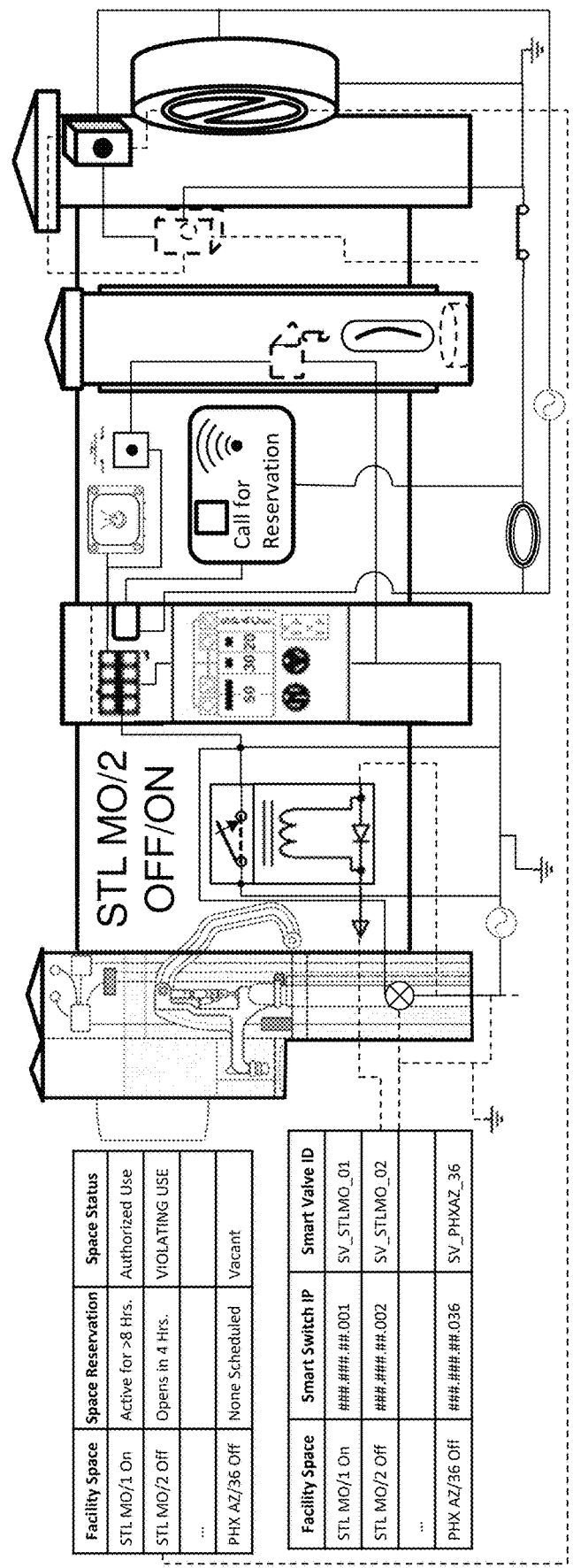

In addition to the spigot assembly and heating assembly, the housing also contains a power source 418, and a local microcontroller 410 for controlling the temperature sensor 412 and a power sensor 408, such as an AC current sensor, and to relay monitored system conditions to the central monitoring computer server 414 as shown in FIG. 6A. When incorporated into the multi service pedestal system discussed above, the microcontroller used to monitor the cold weather hydrant may be universal to the system rather than solely dedicated to the hydrant. For example, the controller which controls the site number light, sign and parking thru-beam sensors may also control the hydrant sensor system rather than having two separate microcontrollers. The wiring schematic shown in FIG. 6C particularly illustrates a single microcontroller for each of the elements discussed herein. However, it will be appreciated that using separate microcontrollers does not depart from the inventive aspects of the innovative hydrant.

Figure 6C:
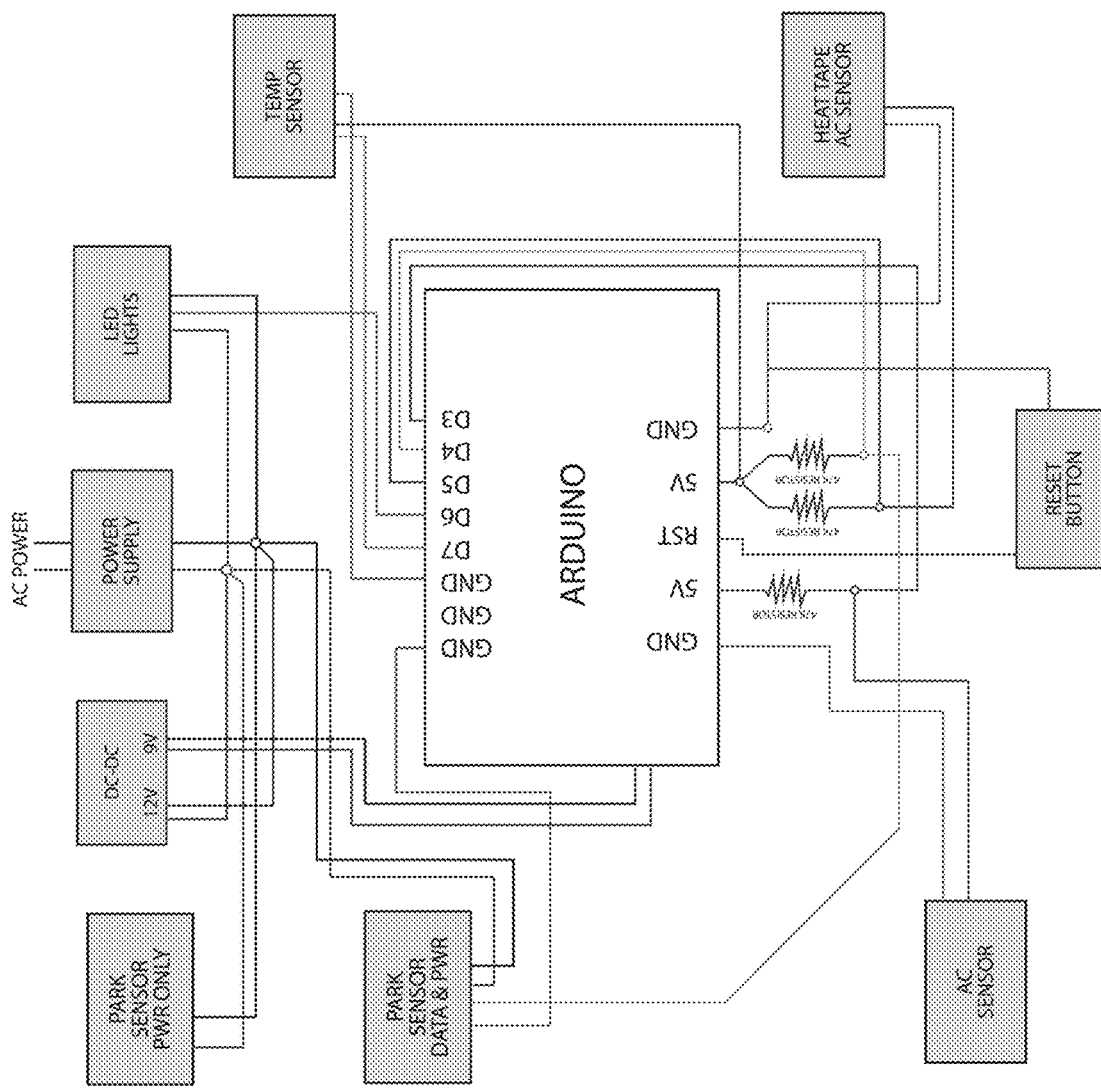
FIG. 6C is an electrical wiring diagram of a parking facility with a cold weather spigot according to the invention described herein

As shown in FIG. 7A and illustrated in the wiring diagram of FIG. 6C, the temperature sensor, thermostat and power sensor also preferably have their own ground 498a, 498b and 498c. In operation, the thermostat controls the heating element by monitoring the air temperature within the housing and activating the heating element based on a preset minimum temperature threshold. To monitor operation of the heating assembly, the power sensor continuously monitors power usage of the heating element with measured power levels 486 corresponding to the active and inactive state 482 of the heating element. Simultaneously, the temperature sensor that is independent from the thermostat in the heating element measures the temperature 484 within the insulated housing. Thus, the local controller continuously monitors the temperature within the housing via the temperature sensor and the power usage of the heating element via the power sensor and relays the information to the central server for processing to assure that the system is operational when power is applied thereto. It will be appreciated that with the growing numbers and types of environmental management systems that are joining the internet of things (IoT), a smart heat tape could be used. The local controller could be a part of the smart heat tape assembly, and rather than having a separate temperature sensor, the thermostat's temperature sensor could be processed in the local controller and communicated to the central server.

Information relayed 488 from the local controller to the centralized monitoring computer server allows a user to remotely access unit information and receive alerts on potential system failures relayed from the central server to a user portal 416 accessed by a user on a user device, such as a tablet or cellular phone, as shown in FIG. 6A. The central server includes a communications module 474 for receiving and relaying data, a processing module 472 for receiving and processing unit information, and a database 476b in a data storage module 476a. The database saves unit data which includes a minimum temperature threshold 478a and a warning temperature threshold 478b for each hydrant being monitored which corresponds to the air temperature within the interior of the housing that is measured by the temperature sensor. The database also includes a minimum power usage threshold 478c corresponding to the power usage of the heating element within each hydrant when it is in the active state. The minimum temperature threshold saved within the database may corresponding with the present minimum temperature for the thermostat of the heating assembly or may be a different minimum. Thus, the monitoring system may operate independently from the operation of the heating assembly.

With the central server in communication with the remote hydrants, users can monitor the local systems from afar, intervene when necessary, and save data in a historical database for later use. It will be appreciated that the AC current sensor could be a part of the smart heat tape assembly described above so the monitoring and warning could be performed locally, and the smart heat tape assembly could provide a local warning signal, such as closing a switch to power a warning light that is illuminated, and/or could send out the warning to the central server. Additionally, with a smart heat tape assembly, it would be possible for the system controller to remotely set and reset the thermostat's threshold operation temperature and the warning threshold temperature from any computer that has access to internet communications and that has authorization to control the smart heat tape assembly.

Although not intended to be limiting, a particular use of historical data in the database could be directed to preventative maintenance wherein historical data may be used to predict when the heating element is reaching the end of its life span and should be replaced. For example, the historical data may find heating elements burn out after 4,000-5,000 hours of use and an alert can be created when the runtime data from the power usage shows that the heating element is approaching the maximum hour limit. Persons having an ordinary skill in the art will appreciate the historical data could also be used for other means.

When the system is operating properly and the thermostat measures an air temperature below the minimum temperature threshold, preferably 38° F., the heating element is powered on while the power sensor connected between the control module and the heating element monitors whether the heating element is active or inactive relative to the power usage. The air temperature from the temperature sensor and the power usage data are subsequently relayed to the central server and users monitoring the system via user portals can see that the air temperature is below the minimum threshold and the heating element is powered on based on the power usage being detected by the power sensor. Once the temperature has risen back to the minimum threshold, the heating element is powered off and the power sensor detects a power usage corresponding to an inactive state. The cycle subsequently continues so long as the system remains operational.

If a failure occurs, the central server will create alerts based on the information received from the local microcontroller in comparison to the expected operational data saved within the database. For example, if a network loss is detected or no communications are received from the local system over a preset relay interval 490, the central monitoring system can produce a relay alert 492 that a local system has failed which may include but is not limited to a loss of power, local sensor or control module malfunction. This relay alert is sent to the user portal and the user can take corrective action.

If the communication network remains operational but the heating element or sensors fail, the local system can produce a sensor alert 480 based on a warning temperature threshold 478b detected within the housing or a minimum temperate within the housing without the heating element being activated. In an example of a first alert condition 494a, if the minimum temperature is 38° F. and a lower temperature is detected within the housing, particularly a temperature below the freezing point of water such as thirty degrees Fahrenheit (30° F.), the processing module creates the sensor alert based on the warning temperature to notify the user that a failure in the temperature sensor or heating element has occurred.

In an example of a second alert condition 494b, if the air temperature within the housing is measured below the minimum temperature threshold but the power sensor detects that the heating element is operating at a level below the minimum usage threshold for the active state, the processing module creates the sensor alert which could indicate that the heating element has failed to properly activate or the sensors have failed to collect accurate measurements. The alert is relayed to the user portal along with the system data so that a user can intervene before the temperature within the housing reaches the warning level.

In both examples, the sensor alerts allow a user to deduce that the system is failing to maintain a minimum temperature within the housing and the water line is susceptible to freezing or that the sensors or controller are failing to relay accurate information even though the other systems may remain functional. In such a case, the system may require a system reset with the reset button on the local microprocessor. This may tend to occur when heating tape burns out over a period of use. Conversely, if the alert conditions are not met, the data can be viewed by the user without receiving an alert 496.

As noted above, the local controller and sensors within the housing are connected to a power source which is preferably a hardline 468 from the local power grid. However, it will be appreciated that other power sources may be used, such as solar power systems that may be better suited for use in remote locations where traditional power grids are not necessarily available. Similar to the microcontroller referenced above, when the hydrant is incorporated into the multi service pedestal described above, it is preferred to use the existing power supply that powers the microcontroller for the site number light, sign and parking thru-beam sensors to power the hydrant sensor system rather than have two separate power supplies. However, the use of multiple power supplies does not depart from the inventive features described herein.

The spigot assembly within the housing includes a head that is fluidly connected to the top of the water line opposite from the spout through which water is dispensed. A valve is included within the spigot head that controls the flow-rate of water through the spout. To actuate the valve from outside the housing, a guest or other user can actuate a handle that protrudes through an aperture 458 within the housing while the valve head is situated entirely within the housing.

Figure 8E:
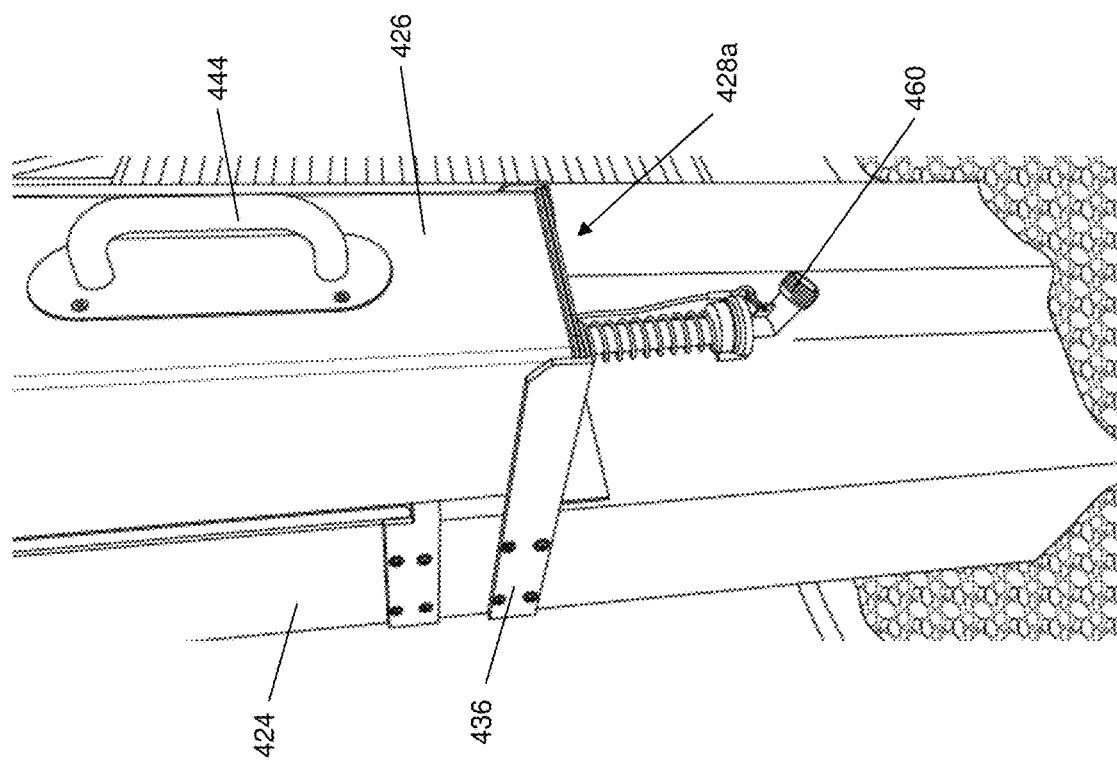
Figure 8D:
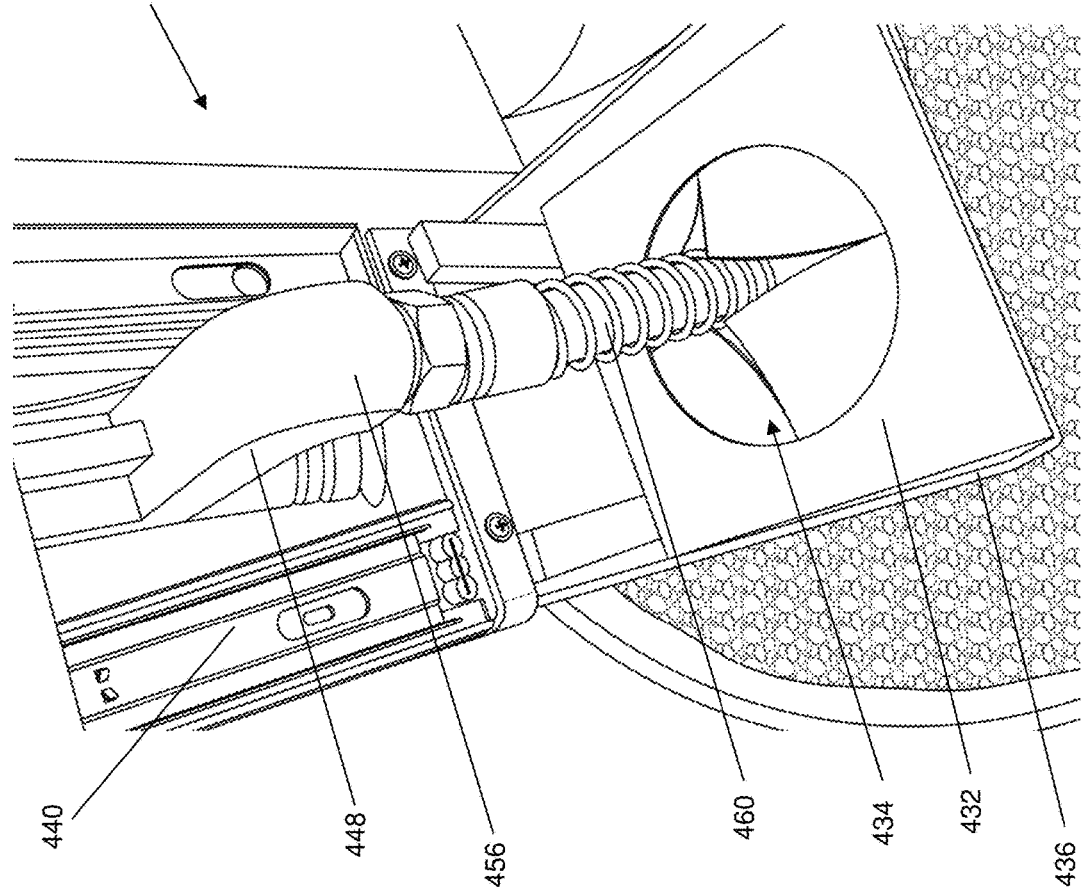

In the preferred embodiment of the hydrant 400a shown in FIGS. 7 and 8, the housing 402a includes a movable section 426 that can be slid into the open position relative to a fixed section 424 to expose the spout of the spigot head while the water line and end of the spigot head opposite from the spout remains within the fixed section of the housing. Once opened, a hose 460 can be inserted into a hose aperture 434 within a platform 432 extending from the fixed section of the housing beneath the bottom 430 of the movable section beneath the spout. The platform is held in place with brackets 436 that connect to the fixed section and the hose aperture is positioned beneath the spout of the spigot head. Subsequently, the movable section of the housing can be closed, as shown in FIG. 7A, and the bottom of the moveable section sits on the top of the platform.

To connect the movable section to the fixed section, rails 440 are attached to the exterior 422 of the fixed section as shown in FIG. 8C. Opposite from the rails, sliders 442 are attached to the exterior of the movable section and slidingly engage the rails. The housing can be opened 428a allowing access to the spout by sliding the movable section upwards and subsequently closed 428b by sliding the movable section downwards. For ease of use, another handle 444 is provided on the exterior of the movable section which the user can grasp to slide the movable section into the open position.

The hose aperture in the platform and the handle aperture in the housing preferably include flexible flaps 438a and 438b that respectively extend over each aperture to allow the hose and handle to pass through the respective apertures while reducing the amount of cold air that can enter the interior of the housing. Furthermore, when no hose is being used, the flaps of the hose aperture are flush with each other to close off the hose aperture. Although the flexible flaps in the preferred embodiment are rubber grommets, other flexible insulation materials may be used including plastic brush grommets.

Figure 10:
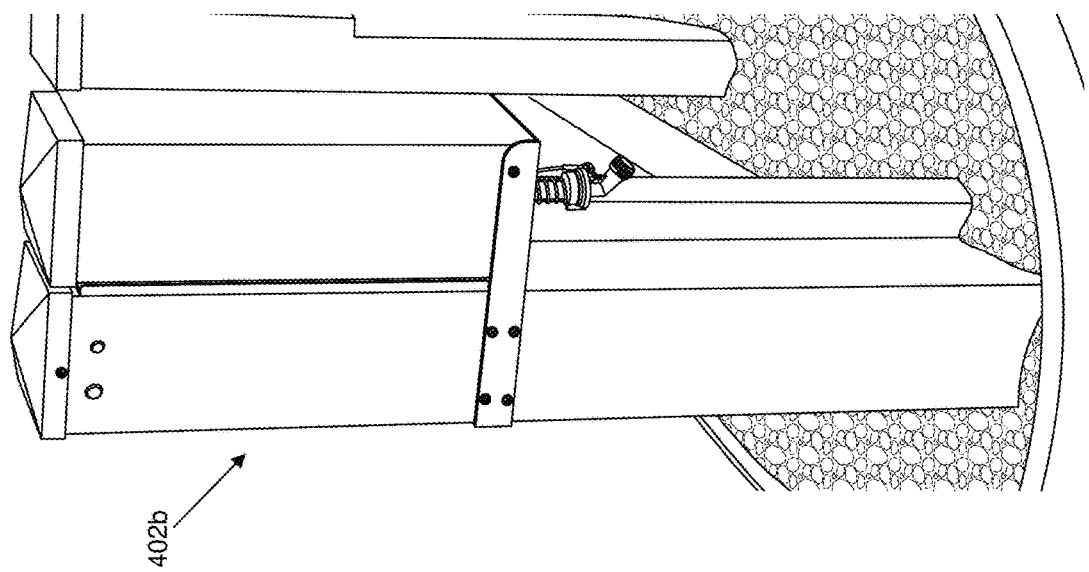
FIG. 10 is a perspective view of the exterior of a cold weather hydrant according to the second embodiment shown in FIG. 10.

In an alternative embodiment of the hydrant 400b shown in FIGS. 9 and 10, the housing 402b may not have any movable section such that the hose is designed to be permanently attached to the end of the nozzle. As shown the hose includes a proximal end 460a attached to the nozzle with the distal end 460b protruding from the hose aperture while being secured to the valve body or housing with a locking cable 466. A user can thereby directly connect their hose to the hose protruding from the hose aperture while the spigot assembly remains entirely within the housing at all times. As the unit is designed to be used without intervention, it is preferred that the hose in this alternative embodiment remains attached only during warmer months to provide an easier connection since there is no freezing to worry about. However, when temperatures drop and freezing is more likely, it is preferred that the short extension hose is not used and heated water hoses are connected during times of freezing temperatures.

In either housing embodiment, the spigot assembly remains within the insulated housing with the hose connected to the spout being the only portion exposed to the elements during use. As explained in the background section above, a traditional frost-proof hydrant may also be used within the cold weather spigot assembly described herein to provide further freeze protection. In operation, the frost-proof hydrant will allow water within the distribution pipe downstream of the valve to drain from the end of the distribution pipe such that no water is within the pipe section within the housing when the valve is closed. However, if a hose remains connected to the end of the nozzle and water cannot drain from the pipe within the housing, the system still prevents freezing as explained herein.

In another aspect of the cold weather system, a light 470 may be mounted to the housing and visible on the external surface. The light is lit when the heating system is powered and ready for operation and is not lit when the heating element is not powered because the parking site is not in use or rented. As with the sensors and heating element discussed above, the light is controlled by the microcontroller and powered by the power source. There can alternatively be multiple lights that are powered by the power source and controlled by the microcontroller to indicate when the heating element is off wherein both lights are off, ready for use when one light is lit, and actively heating when both lights are lit. As referenced above, the cold weather spigot assembly is also preferably integrated with the multi service pedestal system and the lights may also notify a guest who has reserved the parking space that the smart valve has been opened and water may be accessed.

When integrated with the multiservice hookup pedestal described herein, it will be appreciated that the cold weather hydrant assembly is not powered on and subsequently inactive unless someone has rented the site. When occupied, the system can then automatically power the cold weather hydrant assembly to control the temperature within the housing and send out pertinent alerts as described above. Similarly, the cold weather system can also include the smart valve that controls when the spigot assembly may dispense potable water as described above. Although the smart valve is particularly described within the general multiservice hookup pedestal, it will also be appreciated that this smart valve could be integrated into the spigot assembly of the cold weather hydrant on its own, without the other service hookup systems, such as the inlet cover and power control system.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, although the preferred embodiment of the cold weather spigot assembly includes a local thermostat which operates the heating element and a separate temperature sensor and microcontroller for monitoring the system, it will be appreciated that a single temperature sensor and controller could be used to operate the heating element and monitor the system as explained above. In such an embodiment, the temperature sensor and controller would function as a thermostat with the sensor monitoring the air temperature within the insulated housing and the controller activating the heating element relative to the temperature minimum threshold established for the unit. Further still, other alternative embodiments could allow users to control local units by sending updated operational parameters to the local controller from the user portal accessed on a user dashboard such as to turn on the heating element ahead of an incoming winter storm before temperatures drop. It is also conceivable that more than one air temperature sensor, such as other ambient temperature sensors, could be added into the housing instead having an active power measurement to indicate a faulty heat tape alert. Therefore, the breadth and scope of the present invention should not be limited by any of the above-described exemplary embodiments, but should be defined only in accordance with the following claims appended hereto and their equivalents.

The invention claimed is:

1. A method for automated controlling cold weather hydrant connected to a potable water main, comprising:
a housing comprising an interior space, an exterior, a fixed section and a movable section, and wherein the movable section slidingly engages the fixed section and slides between an open position and a closed position;
a spigot assembly situated within the interior space comprising a spigot head and a water line, wherein the spigot head comprises a spout, wherein the spigot head extends from the interior space of the fixed section to the spout in the movable section, wherein the water line is situated within the fixed section of the housing and fluidly connects the potable water main to the spigot head opposite from the spout, and wherein the spout is situated below a bottom side of the movable section when the movable section is in the open position and is contained within the moveable section when the moveable section is in the closed position;
a heating assembly situated within the interior space proximate to at least a portion of the water line, wherein the heating assembly comprises a heating element;
a temperature sensor and a power sensor situated within the interior space and a local microcontroller, wherein the temperature sensor measures an air temperature within the interior space, wherein the power sensor measures a power usage of the heating element, and wherein the local microcontroller is in operative communication with the temperature sensor and the power sensor; and
a centralized monitoring computer server located distally from the housing and a user account in operative communication with centralized monitoring computer server, wherein the centralized monitoring computer server comprises a processing module, a communications module and a database in a data storage module, wherein the centralized monitoring computer server is in remote communication with the local microcontroller via the communications module, wherein the database contains a minimum temperature threshold and a warning temperature corresponding with the air temperature within the interior space and a minimum power usage threshold corresponding to the heating element in an active state, wherein the centralized monitoring computer server receives an air temperature measurement corresponding to the air temperature within the interior space from the temperature sensor and a power usage measurement from the power sensor, wherein the processing module correlates the air temperature measurement with the minimum temperature threshold and the warning temperature threshold, wherein the processing module correlates the power usage measurement with the minimum power usage threshold, wherein the processing module creates a sensor alert if at least one of the air temperature measurement is less than the warning temperature and the air temperature measurement is less than the minimum temperature threshold while the power usage measurement is less than the minimum power usage threshold corresponding with the active state, and wherein the sensor alert is relayed from the communications module to the user account.

2. The method of claim 1, wherein the heating assembly further comprise a thermostat having a minimum temperature threshold corresponding to the air temperature within the interior space, wherein the heating element further comprises an active state and an inactive state operatively controlled by the thermostat, and wherein the thermostat activates the heating element when the air temperature is less than the minimum temperature threshold and inactivates the heating element when the air temperature is at least as great as the minimum temperature threshold.

3. The method hydrant of claim 1, wherein the centralized monitoring computer server receives the air temperature measurement and the power usage measurement at an established time interval, wherein the processing module creates a relay alert when at least one of the air temperature measurement and the power usage measurement are not received at the established time interval, and wherein the relay alert is relayed from the communications module to the user account.

4. The method of claim 1, wherein the heating element further comprises a heat tape situated within a conduit, and wherein the conduit abuts the water line within the interior space of the housing.

5. The method of claim 1, wherein the spigot head further comprises a valve operatively controlled by a handle, wherein the valve comprises a range of flow rates of between a no-flow rate and a full-flow rate, inclusive, wherein the housing comprises a handle aperture and a plurality of flexible flaps covering the aperture, and wherein handle protrudes through the actuator aperture from the spigot head.

6. The method of claim 1, wherein the housing further comprises a platform extending from the fixed section beneath the bottom side of the movable section, wherein the bottom side of the movable section sits on the platform in the closed position, and wherein the platform comprises an aperture and a plurality of flexible flaps covering the aperture.

7. The method of claim 1, further comprising a power supply situated within the interior space and operatively connected to the heating assembly, the temperature sensor and the current sensor.

8. The method of claim 7, further comprising an electrically actuated valve fluidly connecting the water line to the spigot head and an electric power circuit operatively connected to the power source, wherein the electric power circuit comprises a smart switch and the electrically actuated valve, wherein the smart switch is in operative communication with a local microcontroller, wherein the smart switch is situated in series between the power source and the electrically actuated valve, wherein the smart switch powers the electrically actuated valve to an open flow state when the microcontroller provides an active status signal, and wherein the spigot head has a range of flow rates between a no-flow rate and a full-flow rate, inclusive, when the electrically actuated valve is in the open flow state.

9. A system of automated controlling cold weather hydrant connected to a potable water main, comprising:
a housing comprising an interior space and an exterior;
a spigot assembly situated within the interior space comprising a spigot head and a water line, and wherein the water line connects the potable water main to the spigot head;
a heating assembly situated within the interior space proximate to at least a portion of the water line, wherein the heating assembly comprises a heating element and a thermostat, wherein the heating element comprises an active state and an inactive state operatively controlled by the thermostat, wherein the thermostat comprises a minimum temperature threshold corresponding to an air temperature within the interior space, and wherein the thermostat activates the heating element when the air temperature is less than the minimum temperature threshold and inactivates the heating element when the air temperature is at least as great as the minimum temperature threshold, wherein the heating element further comprises a heat tape situated within a conduit, and wherein the conduit abuts the water line;

a temperature sensor and a power sensor situated within the interior space and a local microcontroller, wherein the temperature sensor measures the air temperature within the interior space, wherein the power sensor measures a power usage of the heating element, and wherein the local microcontroller is in operative communication with the temperature sensor and the power sensor; and a centralized monitoring computer server located distally from the housing and a user account in operative communication with the centralized monitoring computer server, wherein the centralized monitoring computer server comprises a processing module, a communications module and a database in a data storage module, wherein the centralized monitoring computer server is in remote communication with the local microcontroller via the communications module, wherein the database contains a minimum temperature threshold and a warning temperature corresponding with the air temperature within the interior space and a minimum power usage threshold corresponding to the heating element in the active state, wherein the centralized monitoring computer server receives an air temperature measurement corresponding to the air temperature within the interior space from the temperature sensor and a power usage measurement from the power sensor, wherein the processing module correlates the air temperature measurement with the minimum temperature threshold and the warning temperature threshold, wherein the processing module correlates the power usage measurement with the minimum power usage threshold, wherein the processing module creates a sensor alert if at least one of the air temperature measurement is less than the warning temperature and the air temperature measurement is less than the minimum temperature threshold while the power usage measurement is less than the minimum power usage threshold corresponding with the active state, and wherein the senor alert is relayed from the communications module to the user account.

10. The system of claim 9, wherein the housing further comprises a fixed section and a movable section, wherein the movable section slidingly engages the fixed section and slides between an open position and a closed position, wherein the spigot head further comprises a spout, wherein the spigot head extends from the interior space of the fixed section to the spout in the movable section, wherein the water line is situated within the fixed section of the housing and fluidly connects the potable water main to the spigot head opposite from the spout, and wherein the spout is situated below a bottom side of the movable section when the movable section is in the open position and is contained within the moveable section when the moveable section is in the closed position.

11. The system of claim 9, wherein the valve head further comprises a valve operatively controlled by a handle, wherein the valve comprises a range of flow rates of between a no-flow rate and a full-flow rate, inclusive, wherein the housing comprises a handle aperture and a plurality of flexible flaps covering the aperture, and wherein handle protrudes through the actuator aperture from the spigot head.

12. The system of claim 9, wherein the centralized monitoring computer server receives the air temperature measurement and the power usage measurement at an established time interval, wherein the processing module creates a relay alert when at least one of the air temperature measurement and the power usage measurement are not received at the established time interval, and wherein the relay alert is relayed from the communications module to the user account.

13. An automated controlling cold weather hydrant connected to a potable water main, comprising:
a housing comprising an interior space and an exterior;
a spigot assembly situated within the interior space comprising a spigot head and a water line, and wherein the water line connects the potable water main to the spigot head;
a heating assembly situated within the interior space proximate to at least a portion of the water line, wherein the heating assembly comprises a heating element;
a temperature sensor situated within the interior space, and wherein the temperature sensor measures air temperature within the interior space;
a power sensor situated within the interior space, and wherein the power sensor measures a power usage of the heating element;
a local microcontroller in operative communication with the temperature sensor and the power sensor; and
a centralized monitoring computer server located distally from the housing, wherein the centralized monitoring computer server comprises a processing module, a communications module and a database in a data storage module, wherein the centralized monitoring computer server is in remote communication with the local microcontroller via the communications module, wherein the database contains a minimum temperature threshold and a warning temperature corresponding with the air temperature within the interior space and a minimum power usage threshold corresponding to the heating element in an active state, wherein the centralized monitoring computer server receives an air temperature measurement corresponding to the air temperature within the interior space from the temperature sensor and a power usage measurement from the power sensor, wherein the processing module correlates the air temperature measurement with the minimum temperature threshold and the warning temperature threshold, and wherein the processing module correlates the power usage measurement with the minimum power usage.

14. The hydrant of claim 13, wherein the housing further comprises a fixed section and a movable section, wherein the movable section slidingly engages the fixed section and slides between an open position and a closed position, wherein the spigot head further comprises a spout and a valve operatively controlled by a handle, wherein the spigot head extends from the interior space of the fixed section to the spout in the movable section, wherein the water line is situated within the fixed section of the housing and fluidly connects the potable water main to the spigot head opposite from the spout, wherein the spout is situated below a bottom side of the movable section when the movable section is in the open position and is contained within the moveable section when the moveable section is in the closed position, wherein the valve comprises a range of flow rates of between a no-flow rate and a full-flow rate, inclusive, wherein the housing comprises a handle aperture and a plurality of flexible flaps covering the aperture, wherein handle protrudes through the actuator aperture from the spigot head, wherein the heating element further comprises a heat tape situated within a conduit, and wherein the conduit abuts the water line within the interior space of the housing.

15. The hydrant of claim 13, further comprising:
- a sensor alert created within the processing module when at least one of the air temperature measurement is less than the warning temperature threshold and the air temperature measurement is less than the minimum temperature threshold while the power usage measurement is less than the minimum power usage threshold corresponding with the active state;
- a relay alert created within the processing module when at least one of the air temperature measurement and the power usage measurement are not received at the established time interval; and
- a user account in operative communication with the centralized monitoring computer server, wherein the sensor alert and the relay alert are relayed from the communications module to the user account.

16. The hydrant of claim 13, wherein thein heating assembly further comprise a thermostat having another minimum temperature threshold corresponding to the air temperature within the interior space, wherein the heating element further comprises the active state and an inactive state operatively controlled by the thermostat, and wherein the thermostat activates the heating element when the air temperature is less than the minimum temperature threshold and inactivates the heating element when the air temperature is at least as great as the minimum temperature threshold.

* * * * *